US012276925B2

(12) United States Patent
Sato

(10) Patent No.: US 12,276,925 B2
(45) Date of Patent: Apr. 15, 2025

(54) IMAGE FORMING APPARATUS AND IMAGE FORMING METHOD FOR TRANSFERRING A POWDER TO AN IMAGE PATTERN ON A RECORDING MEDIUM

(71) Applicant: KONICA MINOLTA, INC., Tokyo (JP)

(72) Inventor: Yuya Sato, Hino (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 18/181,381

(22) Filed: Mar. 9, 2023

(65) Prior Publication Data

US 2023/0305440 A1 Sep. 28, 2023

(30) Foreign Application Priority Data

Mar. 10, 2022 (JP) ................................ 2022-036790

(51) Int. Cl.
*G03G 15/08* (2006.01)
*G03G 15/00* (2006.01)

(52) U.S. Cl.
CPC ..... *G03G 15/0891* (2013.01); *G03G 15/6573* (2013.01); *G03G 15/6582* (2013.01); *G03G 15/6585* (2013.01); *G03G 2215/00797* (2013.01); *G03G 2215/00805* (2013.01)

(58) Field of Classification Search
CPC ........... G03G 15/0891; G03G 15/0157; G03G 15/0173; G03G 15/0194; G03G 15/6573; G03G 15/6582; G03G 15/6585; G03G 2215/0789; G03G 2215/00805; G03G 2215/00797
See application file for complete search history.

(56) References Cited

U.S. PATENT DOCUMENTS

| | | | | |
|---|---|---|---|---|
| 2010/0195126 A1* | 8/2010 | Shiozawa | ............ | G03G 15/502 358/1.9 |
| 2012/0051814 A1* | 3/2012 | Fukamachi | ........ | G03G 15/6585 399/341 |
| 2014/0147149 A1* | 5/2014 | Kiuchi | .............. | G03G 15/2028 399/68 |
| 2018/0348668 A1* | 12/2018 | Fujita | ................ | G03G 15/0865 |
| 2018/0373175 A1* | 12/2018 | Fujita | ................ | G03G 15/2064 |

(Continued)

FOREIGN PATENT DOCUMENTS

JP 2020095209 A 6/2020

*Primary Examiner* — Arlene Heredia
*Assistant Examiner* — Laura Roth
(74) *Attorney, Agent, or Firm* — Buchanan Ingersoll & Rooney PC

(57) ABSTRACT

An image forming apparatus includes a powder holding member and a transfer member. The powder holding member holds a powder pattern constituted by powder on a surface. The transfer member constitutes a nip part for nipping a recording medium on which an image pattern is formed with the powder holding member, and pastes powder constituting the powder pattern to the image pattern at the nip part. The image forming apparatus also includes a powder supply member that supplies powder to the surface of the powder holding member, and an adhesion force of the powder to the conveyance member is smaller than an adhesion force of the powder to a part where the powder pattern is formed on the surface of the powder holding member.

19 Claims, 9 Drawing Sheets

(56) References Cited

U.S. PATENT DOCUMENTS

| | | | | |
|---|---|---|---|---|
| 2019/0155197 | A1* | 5/2019 | Fujita | G03G 15/6585 |
| 2020/0125004 | A1* | 4/2020 | Fujita | G03G 15/6591 |
| 2020/0125012 | A1* | 4/2020 | Fujita | G03G 15/6591 |
| 2020/0174387 | A1* | 6/2020 | Hiramoto | G03G 9/0827 |
| 2022/0121147 | A1* | 4/2022 | Izawa | G03G 15/6585 |

* cited by examiner

IMAGE FORMING APPARATUS AND IMAGE FORMING METHOD FOR TRANSFERRING A POWDER TO AN IMAGE PATTERN ON A RECORDING MEDIUM

The entire disclosure of Japanese patent Application No. 2022-036790, filed on Mar. 10, 2022, is incorporated herein by reference in its entirety.

BACKGROUND

Technological Field

The present invention relates to an image forming apparatus and an image forming method.

Description of the Related Art

As one of metallic printing techniques for forming a glossy decorative image, a technique for adhering powder to a toner image is known. For example, JP 2020-095209 A describes that "glossy powder P is supplied to the powder holding surface 22*a* of the powder holding member 22 in the powder pasting apparatus 20, and the powder holding surface 22*a* is rubbed with the rubbing member 24 to adhesively hold the powder P in an oriented state in a single layer. In this state, the recording medium S having passed through the heating member 21 is conveyed to the nip part between the powder holding member 22 and the opposing member 25 of the powder pasting apparatus 20. As a result, the powder P adhesively held on the powder holding surface 22*a* of the powder holding member 22 is transferred to the image pattern 100 exhibiting adhesiveness by melting while maintaining the adhesive state on the powder holding surface 22*a*, that is, while maintaining the oriented state in a single layer." As a result, it describes that "since the glossy powder P is pasted on the surface of the image pattern 100 functioning as an adhesive in an oriented state in a single layer, it is possible to obtain the glossy image 101 having sufficient glossiness."

However, in the metallic printing technique described above, the powder is adhesively held to the entire surface of the powder holding surface of the powder holding member. For this reason, at the nip part, there is a risk that the powder is arranged to face the background portion where the image pattern is not formed in the recording medium, and the powder is transferred to the background portion. The powder transferred to the background portion is easily visible due to its glossiness even in a small amount, and adversely affects the characteristics of the image formed on the recording medium.

SUMMARY

Therefore, an object of the present invention is to provide an image forming apparatus and an image forming method capable of finely forming a decorative image having a pattern to which powder is pasted.

To achieve the abovementioned object, according to an aspect of the present invention, an image forming apparatus reflecting one aspect of the present invention comprises: a powder holding member that holds a powder pattern constituted by powder on a surface; and a transfer member that constitutes a nip part for nipping a recording medium on which an image pattern is formed with the powder holding member, and pastes powder constituting the powder pattern to the image pattern at the nip part.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
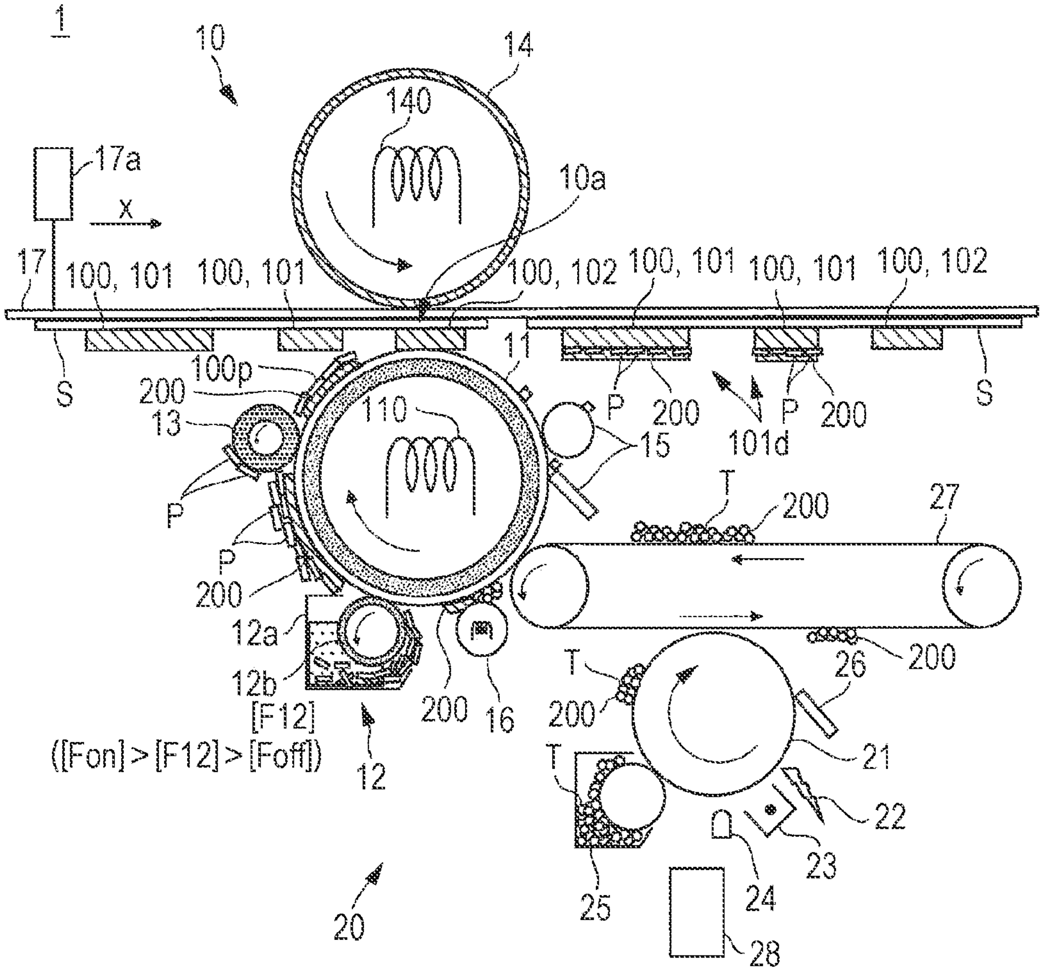
FIG. 1 is a configuration diagram of an image forming apparatus according to a first embodiment.

Hereinafter, one or more embodiments of a powder pasting apparatus, an image forming apparatus, a powder pasting method, and an image forming method of the present invention will be described with reference to the drawings. However, the scope of the invention is not limited to the disclosed embodiments. Note that, in each embodiment, the same components are denoted by the same reference numerals, and the description of the overlapping configurations will be omitted.

First Embodiment

FIG. 1 is a configuration diagram of an image forming apparatus 1 according to a first embodiment of the present invention. The image forming apparatus 1 illustrated in this drawing is for forming a decorative image having a pattern to which powder is pasted, and includes a powder pasting apparatus 10 and a powder holding pattern forming apparatus 20. Hereinafter, configurations of the powder pasting apparatus 10 and the powder holding pattern forming apparatus 20 will be sequentially described.

<Powder Pasting Apparatus 10>

The powder pasting apparatus 10 pastes powder P to an image pattern 100 formed in advance on the main surface of a recording medium S to form a decorative pattern 101*d*, and forms a decorative image having the decorative pattern 101*d*. The powder P has, for example, glossiness, and in this case, the image pattern 100 can be a glossy decorative pattern 101*d*.

Here, in the image pattern 100 formed in advance on the main surface of the recording medium S, there may be a non-decorative pattern 102 to which the powder P is not pasted in addition to a base pattern 101 to which the powder P is pasted. The non-decorative pattern 102 is, for example, a text pattern such as an explanatory sentence for explaining an image constituted by the decorative pattern 101*d*. The base pattern 101 and the non-decorative pattern 102 may be patterns formed in the same process, or may be patterns formed by different processes, different apparatuses, and different materials.

The powder pasting apparatus 10 pastes the powder P only on the base pattern 101 of the image pattern 100. In addition, the entire image pattern 100 may be the base pattern 101. Note that, here, it is assumed that at least the base pattern 101 of the image pattern 100 is constituted by, for example, toner.

Such a powder pasting apparatus 10 has a cylindrical powder holding member 11. In addition, the powder pasting apparatus 10 includes a powder supply member 12, a rubbing member 13, a transfer member 14, a cleaning member 15, and a fixing member 16 which are arranged in this order along a side peripheral surface (hereinafter, side circumferential surface) of the cylindrical powder holding member 11. The powder pasting apparatus 10 further includes a conveyance path 17 for conveying the recording medium S. Hereinafter, the configuration of each of these members will be described, and then the configuration of the powder P used here will be described.

[Powder Holding Member 11]

The powder holding member 11 has a cylindrical shape, and rotates about a cylindrical shaft by a drive motor. In addition, the powder holding member 11 constitutes the nip part 10*a* that pressurizes and sandwiches the recording medium S together with the conveyance path 17 with the transfer member 14 described below. Such a powder holding member 11 has a powder holding pattern 200 having adhesiveness on a cylindrical side circumferential surface. The powder holding member 11 holds the powder P described below by adhering the powder P to the powder holding pattern 200. The powder holding pattern 200 is a pattern formed by the powder holding pattern forming apparatus 20 described below.

Figure 2:
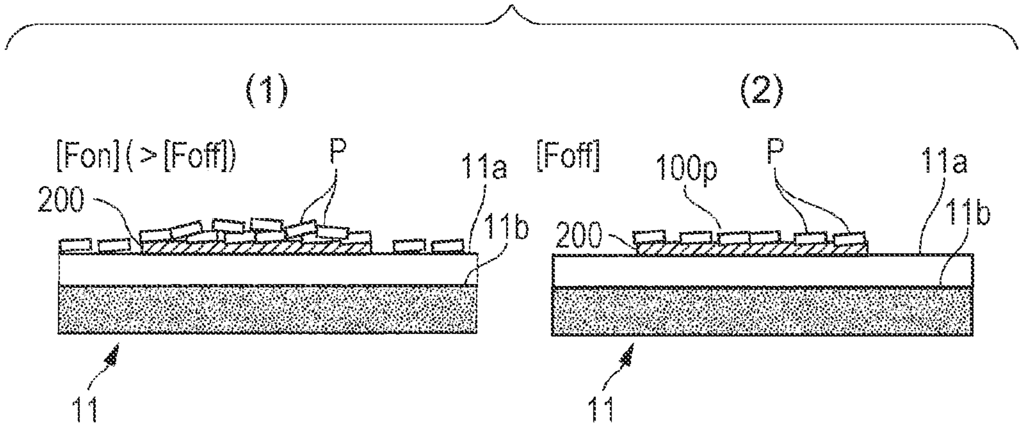
FIG. 2 is an enlarged cross-sectional view of a surface layer of a powder holding member in the first embodiment.

FIG. 2 is an enlarged cross-sectional view of a surface layer of the powder holding member 11 in the first embodiment, and is an enlarged cross-sectional view of a surface layer of the side circumferential surface of the cylindrical powder holding member 11. As illustrated in this figure, the surface layer of the powder holding member 11 has a laminated structure of an outermost release layer 11*a* and an elastic layer 11*b* provided as abase of the release layer 11*a*, and has the powder holding pattern 200 on the upper portion of the release layer 11*a*.

Referring to FIGS. 1 and 2, the powder holding member 11 includes a heating mechanism 110, and the side circumferential surface including the surface of the powder holding pattern 200 is heated.

The release layer 11*a* is a layer for preventing an image offset in which the image pattern 100 on the recording medium S adheres to the powder holding member 11 side in the nip part 10*a* sandwiching the recording medium S between the powder holding member 11 and the transfer member 14. The release layer 11*a* is also a layer for preventing adhesion of the powder P, and exhibits weak adhesion force [Foff] to the powder P. Such a release layer 11*a* is preferably constituted by a material having heat resistance, and is, for example, a layer using a fluororesin.

In addition, the elastic layer 11*b* is a layer for causing the side circumferential surface of the powder holding member 11 to follow the surface of the recording medium S in the nip part 10*a* described above. Such an elastic layer 11*b* is preferably constituted by a material having heat resistance, and is a layer using, for example, urethane rubber or silicone rubber.

In addition, the powder holding pattern 200 provided on the side circumferential surface of the powder holding member 11 is a pattern constituted by an adhesive material. Here, the powder holding pattern 200 is constituted by a toner T as a coloring material supplied from the powder holding pattern forming apparatus 20 to be described later, and is melted by heating to a predetermined temperature to exhibit a strong adhesion force [Fon] to the powder P. Here, the strong adhesion force [Fon] to the powder P is stronger than the adhesion force [Foff] of the release layer 11*a* to the powder P, and the adhesion amount [Foff]<adhesion force [Fon] is satisfied.

The toner T as the coloring material constituting the powder holding pattern 200 may be any of a colorless transparent toner, a white toner, and a color toner. When the adhesive material constituting the powder holding pattern 200 is a color toner, the color tone of the color toner is appropriately selected according to the color tone of the base pattern 101 formed on the recording medium S, and is, for example, the same color as the base pattern 101.

In particular, on the side circumferential surface of the powder holding member 11, the powder holding pattern 200 has a pattern shape corresponding to the base pattern 101 formed on the recording medium S. Here, corresponding means a mirror image pattern having a pattern shape and arrangement obtained by inverting the recording medium S in the width direction perpendicular to the conveyance direction x of the recording medium S supplied to the nip part 10*a*.

Note that the powder holding pattern 200 is not limited to one constituted by the toner, and may be constituted by using a material capable of realizing the above-described adhesion force [Fon].

[Powder Supply Member 12]

The powder supply member 12 is for supplying the powder P to the side circumferential surface of the powder holding member 11, and is provided along the axial direction of the cylindrical powder holding member 11. The powder supply member 12 includes a storage container 12*a* that stores the powder P and a conveyance member 12*b* accommodated in the storage container 12*a*.

Among them, the storage container 12*a* has an opening disposed along the axial direction of the cylindrical powder holding member 11.

The conveyance member 12*b* is, for example, a rotating columnar member. The conveyance member 12*b* rotates in the direction opposite to the powder holding member 11 to convey the powder P stored in the storage container 12*a* to the opening of the storage container 12*a*, and supplies the powder P to the side circumferential surface of the powder holding member 11. The powder supply member 12 includes a regulating member (not illustrated) arranged to face the side circumferential surface of the conveyance member 12*b*, and is configured to supply a certain amount of powder P to the side circumferential surface of the powder holding member 11.

Such a side circumferential surface of the conveyance member 12*b* preferably has adhesiveness from the viewpoint of holding the powder P, and the powder P is transferred from the side circumferential surface of the conveyance member 12*b* to the side circumferential surface of the powder holding member 11. In such a conveyance member 12*b*, it is preferable that the adhesion force [F12] to the powder P on the side circumferential surface is larger than the adhesion force [Foff] to the powder P in the release layer 11*a* of the powder holding member 11 described above, and the relationship of the adhesion force [F12]> the adhesion force [Foff] is satisfied. In addition, it is preferable that the adhesion force [F12] to the powder P on the side circumferential surface of the conveyance member 12*b* is smaller than the adhesion force [Fon] to the powder P on the powder holding pattern 200 of the powder holding member 11 described above, and the relationship of the adhesion force [Fon]> the adhesion force [F12] is satisfied. As a result, the transfer of the powder P from the conveyance member 12*b* to the exposed portion of the release layer 11*a* of the powder holding member 11 can be suppressed (see FIG. 2(1)).

In addition, since the heat from the powder holding member 11 is transferred, the material constituting the surface of the conveyance member 12*b* preferably has heat resistance, and is constituted by using, for example, silicone rubber.

[Rubbing Member 13]

The rubbing member 13 rubs the side circumferential surface of the powder holding member 11 covered with the powder P supplied from the powder supply member 12. Thus, the excess powder P is removed from the side circumferential surface of the powder holding member 11. Specifically, the powder P adhering to the release layer 11*a* of the powder holding member 11 with a weak adhesion force [Foff] or the upper powder P of the powder P laminated in a plurality of layers with respect to the powder holding pattern 200 is removed. At the same time, the rubbing member 13 rubs the side circumferential surface of the powder holding member 11 to orient the powder P held on the powder holding pattern 200 of the powder holding member 11 along the surface of the powder holding pattern 200 (see FIG. 2(2) for the above). By orienting the powder P, the contact area between each powder P and the powder holding pattern 200 is increased, and the adhesion force of the powder P to the powder holding pattern 200 is increased. As described above, it is possible to prevent excessive transfer of the powder particles P from the side circumferential surface of the powder holding member 11 onto the recording medium S. In addition, by holding the powder P in the oriented state with respect to the powder holding pattern 200, the powder P transferred from the powder holding pattern 200 onto the recording medium S can also be maintained in the oriented state.

The rubbing member 13 is a cylindrical roller around which a brush, sponge, rubber, or nonwoven fabric is wound, and is disposed in contact with the side circumferential surface of the powder holding member 11 so as to rub the side circumferential surface of the rotating powder holding member 11. Note that the rubbing member 13 may be rotated by giving a speed difference to the rotation of the powder holding member 11. In addition, a recovery unit for recovering the excess powder P removed from the powder holding member 11 may be disposed around the rubbing member.

[Transfer Member 14]

The transfer member 14 is for transferring the powder P adhesively held on the powder holding pattern 200 on the powder holding member 11 to the base pattern 101 formed on the main surface of the recording medium S. The transfer member 14 has a cylindrical shape, and constitutes the nip part 10*a* that pressurizes and sandwiches the recording medium S together with the conveyance path 17 with the powder holding member 11.

The transfer member 14 includes a heating mechanism 140. By heating the transfer member 14 by the heating mechanism 140, the image pattern 100 on the recording medium S is melted and exhibits adhesiveness. Then, the powder holding pattern 200 provided on the powder holding member 11 corresponding to the base pattern 101 of the image pattern 100 and the powder P adhesively held in an oriented state on the powder holding pattern 200 are pressed against the base pattern 101. As a result, the powder Pin the oriented state is transferred from the side circumferential surface of the powder holding member 11 to the base pattern 101, and the powder P is pasted to the base pattern 101. In addition, since the powder holding pattern 200 of the powder holding member 11 is formed on the upper portion of the release layer 11*a*, the powder holding pattern 200 is also transferred to the base pattern 101 side together with the oriented powder P.

Note that, after the image pattern 100 including the base pattern 101 and the powder holding pattern 200 pass through the nip part 10*a*, the temperature decreases and the image pattern and the powder holding pattern are cured. Therefore, the adhesive property is exhibited by curing, and the powder P is adhered and held to the image pattern 100 and the powder holding pattern 200. As a result, it is possible to obtain the decorative pattern 101*d* in which the glossy powder P is pasted on the surface of the base pattern 101 constituted by the toner T as the adhesive material.

[Cleaning Member 15]

The cleaning member 15 removes the powder P and the residue of the powder holding pattern 200 from the side circumferential surface of the powder holding member 11 that has passed through the nip part 10*a* constituted by the transfer member 14 and the powder holding member 11. Such a cleaning member 15 is a cylindrical member around which a brush, sponge, rubber, or nonwoven fabric (web) is wound, and is used in contact with the side circumferential surface of the powder holding member 11. The cylindrical cleaning member 15 may be rotated with a speed difference from the powder holding member 11. The cleaning member 15 may have a plate shape or a sheet shape made of metal or resin. The plate-shaped or sheet-shaped cleaning member 15 is used with an end side in contact with the side circumferential surface of the powder holding member 11, and damps and scrapes a residue on the side circumferential surface of the powder holding member 11. In addition, the cleaning member 15 may be a combination of a cylindrical shape and a plate shape or a sheet shape.

By providing such a cleaning member 15, it is possible to prevent the powder P remaining on the side circumferential surface of the powder holding member 11 after passing through the nip part and the residue of the powder holding pattern 200 from being supplied to the recording medium S and transferred when passing through the nip part next by the rotation of the powder holding member 11.

[Fixing Member 16]

The fixing member 16 pressurizes the powder holding pattern 200 against the side circumferential surface of the powder holding member 11 to fix the powder holding pattern to the side circumferential surface of the powder holding member 11. The powder holding pattern 200 is a pattern formed on the side circumferential surface of the powder holding member 11 by the powder holding pattern forming apparatus 20 described below, and is, for example, a pattern constituted by toner particles. In addition, the powder holding member 11 includes the heating mechanism 110, and the side circumferential surface is in a heated state. As a result, the powder holding pattern 200 pressurized between the side circumferential surface of the powder holding member 11 and the fixing member 16 is heated at the same time as being pressurized, and for example, the toner particles are softened to form a film-like pattern exhibiting adhesiveness.

Such a fixing member 16 has a cylindrical shape, and is disposed on the downstream side of the powder holding pattern forming apparatus 20 described below and on the upstream side of the powder supply member 12 described above with respect to the rotation direction of the powder holding member 11. In addition, the side circumferential surface of the fixing member 16 preferably has a configuration in which a release layer made of a fluororesin is provided on a base layer made of silicone rubber, similarly to the fixing portion of the electrophotographic image forming apparatus.

[Conveyance Path 17]

The conveyance path 17 conveys the recording medium S on which the image pattern 100 is formed in the conveyance direction x toward the nip part 10*a*. Such a conveyance path 17 is constituted by, for example, a belt conveyance apparatus, and conveys the recording medium S held on the outer circumferential surface of the belt in a conveyance direction x perpendicular to the axis of the cylindrical powder holding member 11, and inserts the recording medium S into the nip part 10*a*. The recording medium S is conveyed to the nip part 10*a* together with the conveyance path 17 in a state where the surface on which the image pattern 100 is formed faces outward.

In addition, the conveyance path 17 includes a conveyance control unit 17*a* for conveying the recording medium S on which the image pattern 100 is formed to the nip part 10*a* at a predetermined timing. The conveyance control unit 17*a* is constituted by a calculator. The calculator is hardware used as a so-called computer, and includes a non-volatile storage unit such as a central processing unit (CPU), a random access memory (RAM), and a read only memory (ROM). The conveyance control unit 17*a* notifies the powder holding pattern forming apparatus described below of the conveyance timing of the recording medium S based on the program stored in the storage unit.

[Powder P]

Next, the configuration of the powder P used in the powder pasting apparatus 10 as described above will be described. The powder P has powder particles having a non-spherical shape that is not a true sphere. The non-spherical powder P preferably has a flat particle shape from the viewpoint of orientation and adhesion along the surface of the powder holding pattern 200. The "flat particle shape" of the non-spherical powder P means a shape in which a ratio of a minor axis to a thickness is three or more, where a maximum length in a particle of the non-spherical powder P is a major axis, a maximum length in a direction orthogonal to the major axis is a minor axis, and a minimum length in a direction orthogonal to the major axis is a thickness.

Since the powder P has such a flat particle shape, when the side circumferential surface of the powder holding member 11 holding the powder P is rubbed with the rubbing member 13, a wide surface including the major axis direction and the minor axis direction of the powder P is adhered to the surface of the powder holding pattern 200 and is held in an oriented state with respect to the surface of the powder holding pattern 200.

The thickness of the non-spherical powder P is preferably about 0.2 to 10 μm, and more preferably 0.2 to 5.0 μm from the viewpoint of sufficiently exhibiting an appearance effect when the powder P adheres to the surface of the image pattern 100 in a state where the powder P is oriented.

When the thickness of the powder P is too small, it becomes difficult to recover the upper powder P due to overlap between the powders P. In this case, the powder P cannot be sufficiently oriented along the surface of the powder holding pattern 200, and it becomes difficult to directly adhere the powder P for one layer to the powder holding pattern 200. Further, the powder P is easily broken during the process of forming the decorative image, and the size of the powder P easily varies. On the other hand, when the thickness of the powder P is too large, the powder P adhered to the image pattern 100 is easily detached from the image pattern 100.

In addition, the major axis and the minor axis of the flat particle-shaped powder P are each preferably about 1 to 50 μm, and more preferably 15 to 50 μm. If the major axis and the minor axis are too small, handling becomes difficult. On the other hand, when the major axis and the minor axis are too large, it becomes difficult to form an image with high resolution, which causes deterioration in gradation of the image.

The constituent material of the powder P as described above is not limited. The powder P is preferably metal powder or metal oxide powder from the viewpoint of exhibiting desired metallic gloss of the final image as long as gloss can be obtained. The non-spherical powder particle can be used by mixing particles of two or more kinds of materials having different materials.

Examples of the powder P include a powder made of a metal material, a powder made of a metal oxide, a powder in which a metal oxide layer or a resin layer is coated on the surface of a metal powder, a powder in which a metal layer or a resin layer is coated on the surface of a metal oxide powder, and a powder in which a metal layer or a metal oxide layer is coated on the surface of a resin powder.

The powder P as described above may be a synthetic product or a commercially available product. Commercially available products used as the powder P include SunshineBabe Chrome Powder, Aurora Powder, and Pearl Powder (all manufactured by GG Corporation), ICEGEL Mirror Metal Powder (manufactured by TAT inc.), Pika Ace MC Shine Dust, Effect C (manufactured by Kurachi Co., Ltd., "Pika Ace" is a registered trademark of the company), PREGEL Magic Powder, Mirror Series (manufactured by PREANFA CO., LTD., "PREGEL" is a registered trademark of the company), Bonnail Shine Powder (manufactured by KsPlanning Co., Ltd., "BONNAIL" is a registered trademark of the company), METASHINE (manufactured by Nippon Sheet Glass Co., Ltd., "METASHINE" is a registered trademark of the company), ELgee neo (manufactured by OIKE & Co., Ltd., "ELgee neo" is a registered trademark of the company), Astroflake (manufactured by NIHON- BOSHITSU CO., LTD., Okazakiichi registered trademark), and aluminum pigment (manufactured by Toyo Aluminium K.K.).

<Powder Holding Pattern Forming Apparatus 20>

Next, the powder holding pattern forming apparatus 20 is an apparatus for forming the powder holding pattern 200 in the powder pasting apparatus 10, and is, for example, an electrophotographic image forming apparatus for forming a toner pattern as the powder holding pattern 200. However, the powder holding pattern 200 formed by the electrophotographic image forming apparatus is a toner pattern made of an aggregate of the toner particles T, does not have adhesiveness in a formed state, and exhibits adhesiveness by subsequent heating.

Such a powder holding pattern forming apparatus 20 includes a photosensitive drum 21, a resetting unit 22, a charging unit 23, an exposure unit 24, a developing unit 25, a cleaning unit 26, a transfer belt 27, and a control unit 28 as a calculator, and forms the powder holding pattern 200 made of an aggregate of toner particles T on the outer circumferential surface of the transfer belt 27. Note that the moving direction of the transfer belt 27 is assumed to be a direction opposite to the rotation direction of the powder holding member 11.

The powder holding pattern forming apparatus 20 transfers the powder holding pattern 200 to the side circumferential surface of the powder holding member 11 downstream of the cleaning member 15 with respect to the rotation direction of the powder holding member 11 of the powder pasting apparatus 10 and upstream of the fixing member 16.

Note that the detailed description of the configuration of the electrophotographic image forming apparatus will be omitted here. However, the control unit 28 controls each unit of the powder holding pattern forming apparatus 20 so that the powder holding pattern 200 having a shape corresponding to the base pattern 101 formed on the recording medium S is formed in accordance with the timing of conveyance of the recording medium S by the conveyance path 17 of the powder pasting apparatus 10. Details of the formation control of the powder holding pattern 200 by the control unit 28 will be described in the following image forming method.

<Image Forming Method>

Next, an image forming method according to the first embodiment will be described. The image forming method described here is an image forming method performed by the image forming apparatus 1 described with reference to FIG. 1, and is performed as follows. First, the control unit 28 of the powder holding pattern forming apparatus 20 acquires data related to an image pattern formed on the recording medium S.

Figure 3:
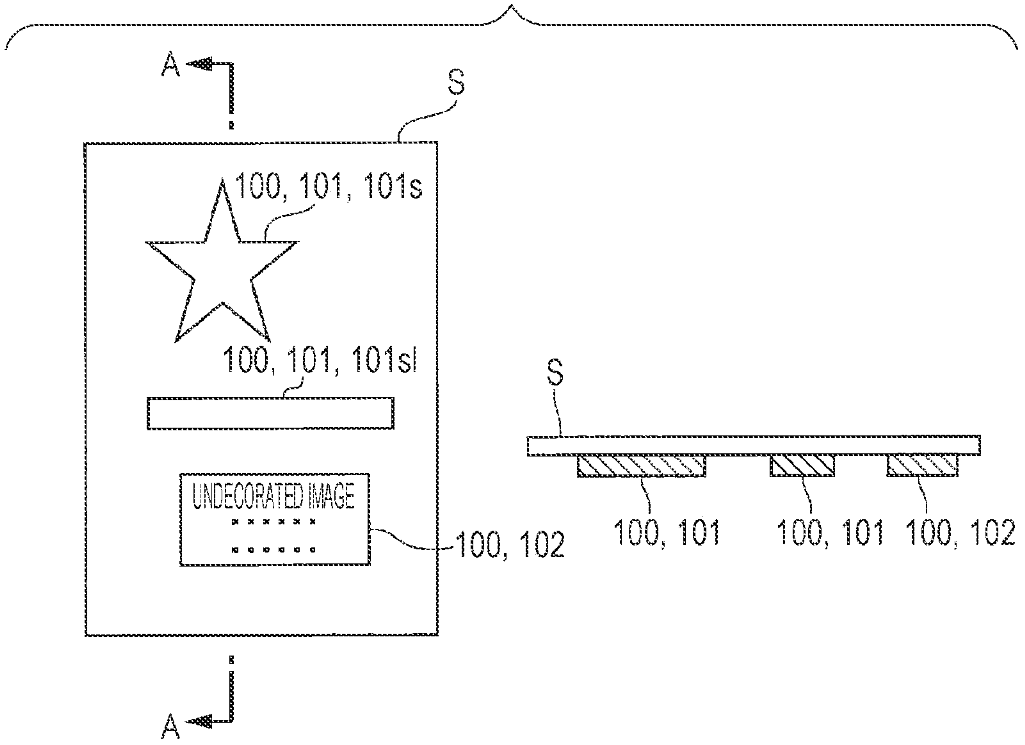
FIG. 3 is a view illustrating an example of an image pattern formed on a recording medium in the first embodiment.

FIG. 3 is a diagram illustrating an example of the image pattern formed on the recording medium S in the first embodiment. As illustrated in FIG. 3, a plurality of image patterns 100 is formed on the recording medium S. These image patterns 100 are base patterns 101 to which the powder P is pasted by the image forming apparatus 1 illustrated in FIG. 1 and non-decorative patterns 102 to which the powder P is not pasted.

Figure 4:
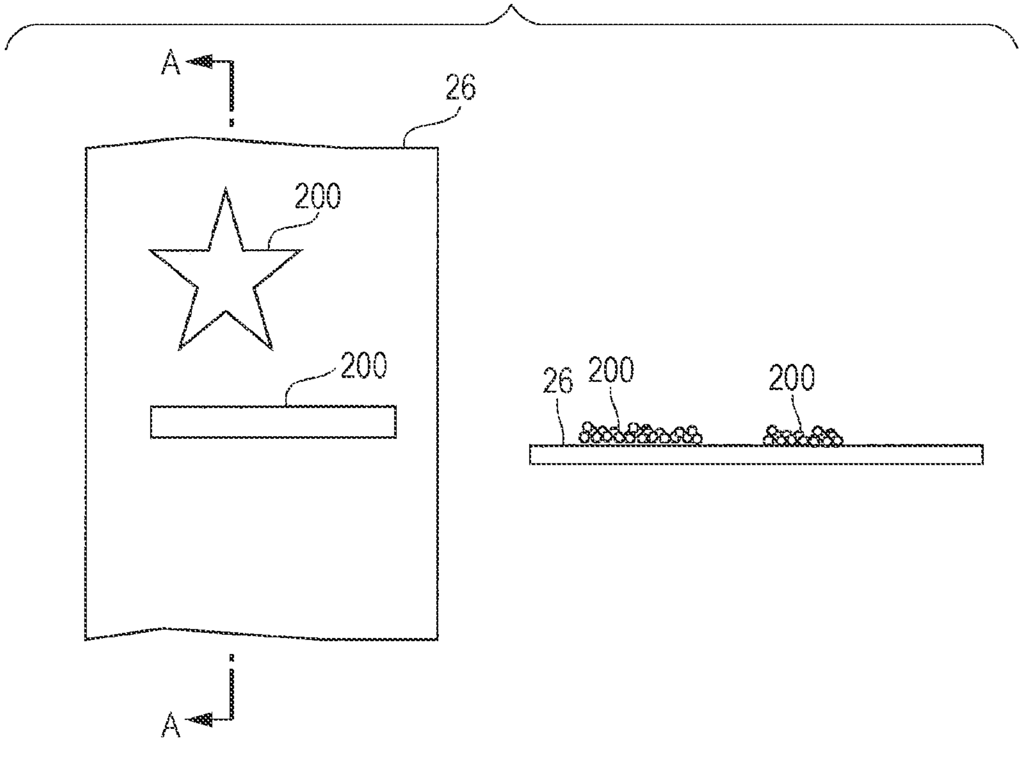
FIG. 4 is a diagram illustrating an example of a powder holding pattern formed by a powder holding pattern forming apparatus in the first embodiment.

Referring to FIGS. 1 to 3, the control unit 28 of the powder holding pattern forming apparatus 20 forms a powder holding pattern 200 having a shape corresponding to the base pattern 101 based on data related to the base pattern 101 in the image pattern 100. FIG. 4 is a diagram for explaining a powder holding pattern formed by the powder holding pattern forming apparatus in the first embodiment. Referring to FIGS. 1 to 4, the control unit 28 of the powder holding pattern forming apparatus 20 forms a toner pattern having a shape corresponding to the base pattern 101 in the image pattern 100 formed on the recording medium S as the powder holding pattern 200 on the outer circumferential surface of the transfer belt 27 under the control of the exposure unit 24 and the like.

As a result, the powder holding pattern 200 made of the toner pattern formed on the outer circumferential surface of the transfer belt 27 is supplied to the side circumferential surface of the powder holding member 11 as the transfer belt 27 moves. Then, the transfer belt 27 of the powder holding pattern forming apparatus 20 transfers the powder holding pattern 200 to the side circumferential surface of the powder holding member 11 rotating in the direction opposite to the transfer belt 27.

The powder holding member 11 conveys the powder holding pattern 200 transferred to the side circumferential surface to the nip part with the fixing member 16, and pressurizes and simultaneously heats the powder holding pattern 200 at the nip part. As a result, the fixing member 16 has a film shape in which the toner particles constituting the powder holding pattern 200 are softened to exhibit adhesiveness. Further, the powder holding member 11 conveys the powder holding pattern 200 exhibiting adhesiveness to the arrangement portion of the powder supply member 12. The powder supply member 12 supplies the powder P to the powder holding pattern 200 conveyed by the powder holding member 11. As a result, the powder P is held on the powder holding pattern 200 (see FIG. 2(1)).

Thereafter, the powder holding member 11 conveys the powder holding pattern 200 holding the powder P to the arrangement portion of the rubbing member 13. As a result, the rubbing member 13 rubs the powder holding pattern 200 holding the powder P, and removes the upper powder P of the powder P held on the powder holding pattern 200. As a result, the powder P held on the powder holding pattern 200 is oriented along the surface of the powder holding pattern 200. Further, the powder P adhering to the release layer 11*a* of the powder holding member 11 is removed by rubbing by the rubbing member 13. (See FIG. 2(2)).

Figure 5:
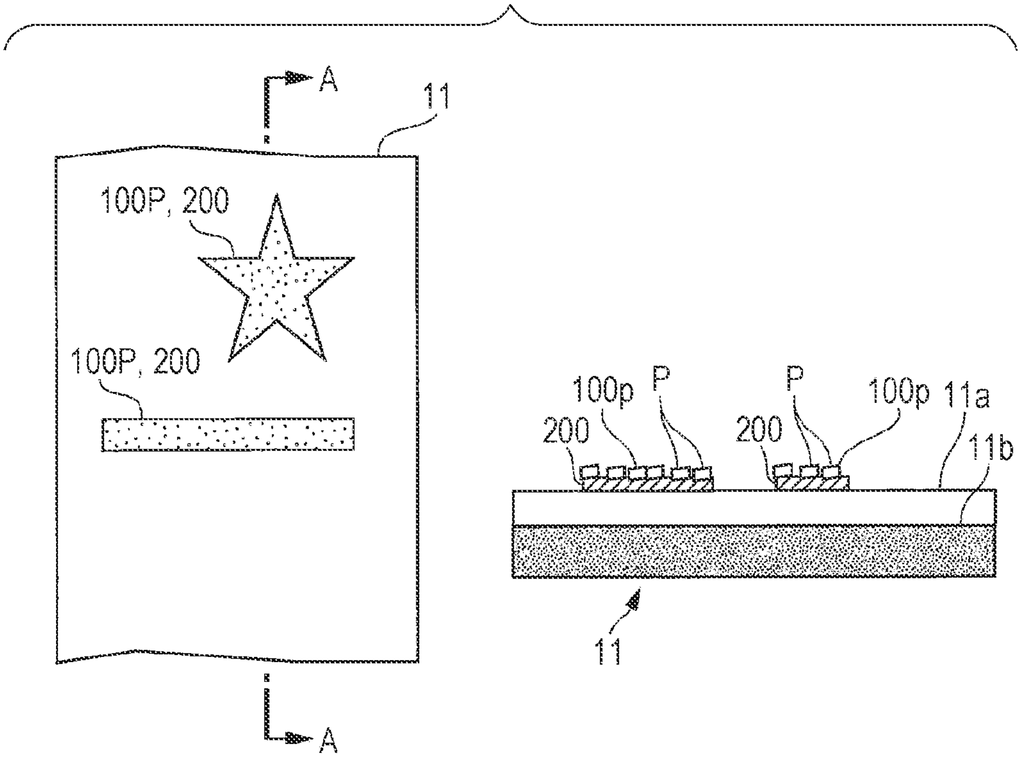
FIG. 5 is a diagram illustrating an example of a powder holding pattern formed on a powder holding member of a powder pasting apparatus in the first embodiment.

FIG. 5 is a diagram illustrating an example of the powder holding pattern 200 formed on the powder holding member 11 of the powder pasting apparatus in the first embodiment. As illustrated in FIG. 5, the powder holding pattern 200 is held on the release layer 11*a* of the powder holding member 11, and the powder P is held on the surface of the powder holding pattern 200 in an oriented state. As a result, a powder pattern 100P constituted by powder is formed on the powder holding pattern 200. In addition, in this state, the powder holding pattern 200 is a mirror image pattern of the base pattern 101 formed on the recording medium S.

Returning to FIG. 1, the powder holding member 11 conveys the powder holding pattern 200 carrying the powder pattern 100P constituted by the powder P to the nip part 10*a* with the transfer member 14.

On the other hand, the conveyance control unit 17*a* of the conveyance path 17 conveys the recording medium S on which the image pattern 100 is formed to the nip part 10*a* at a predetermined timing in accordance with the conveyance of the powder holding pattern 200 by the powder holding member 11. Here, the predetermined timing is a timing at which each base pattern 101 formed on the recording medium S and each powder holding pattern 200 formed on the powder holding member 11 corresponding to the base pattern 101 are laminated at the nip part 10*a*. The conveyance control unit 17*a* of the conveyance path 17 controls the timing of conveyance of the recording medium S as described above on the basis of, for example, a signal from the control unit 28 of the powder holding pattern forming apparatus 20.

The nip part 10*a* pressurizes, in a heated state, the recording medium S conveyed by the conveyance path 17 and the powder holding pattern 200 on which the powder P is carried in an oriented state on the outer circumferential surface of the powder holding member 11. As a result, the image pattern 100 including the base pattern 101 constituted by the toner also exhibits adhesiveness, and the powder holding pattern 200 in a state of holding the powder P is transferred from the release layer 11*a* of the powder holding member 11 to the side of the base pattern 101 exhibiting adhesiveness.

Figure 6:
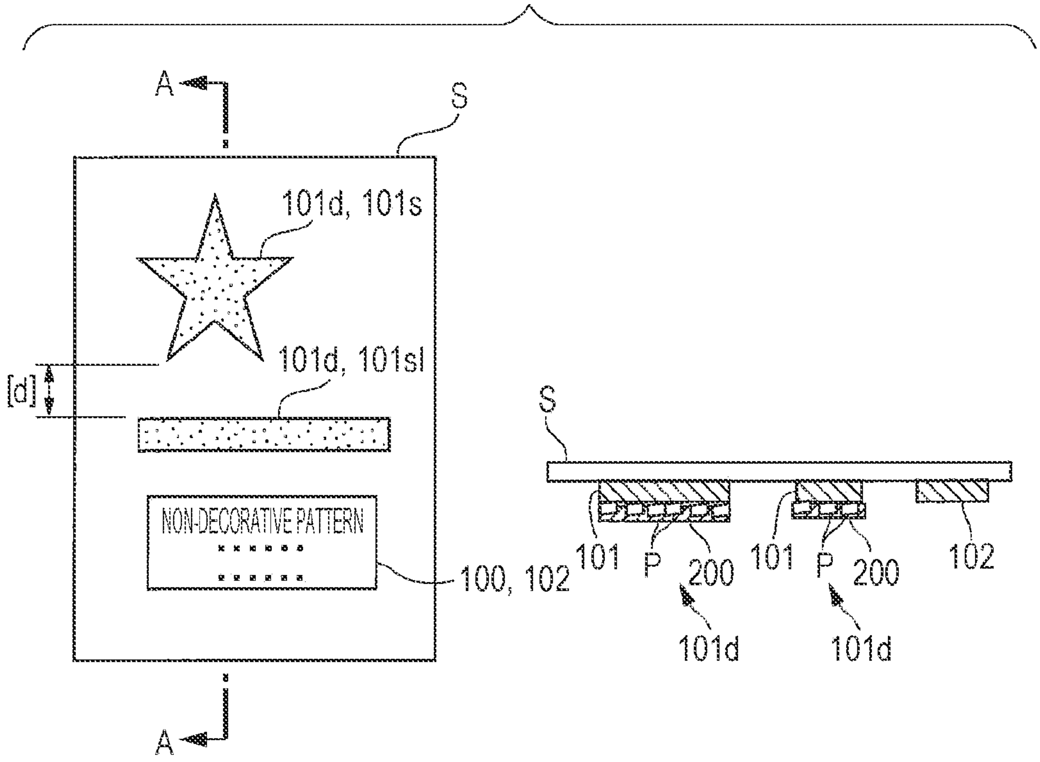
FIG. 6 is a view illustrating an example of a decorative image formed on a recording medium in the first embodiment.

As described above, the decorative pattern 101*d* in which the powder P is pasted to the base pattern 101 of the image pattern 100 formed on the recording medium S is formed, and a decorative image having the decorative pattern 101*d* is obtained. Note that, since the image pattern 100 including the base pattern 101 on the recording medium S is cured by lowering the temperature after passing through the nip part 10*a*, the adhesive property is exhibited by curing, and the powder P is adhered and held to the base pattern 101. FIG. 6 is a diagram illustrating an example of the decorative image formed on the recording medium S in the first embodiment. As illustrated in FIG. 6, the recording medium S has the decorative pattern 101*d* in which the powder P is pasted to the base pattern 101 of the image pattern 100.

Effects of First Embodiment

According to the first embodiment described above, the powder pattern 100P made of the powder P is formed in a shape corresponding to the base pattern 101 in the image pattern 100, and the powder pattern 100P is bonded to the base pattern 101 in the nip part 10*a*. As a result, in the nip part 10*a*, contact of the powder P with the background of the image pattern 100 including the base pattern 101 is suppressed. As a result, the powder P can be prevented from adhering to the background of the decorative pattern 101*d* to which the powder P is pasted, and a decorative image having the decorative pattern 101*d* can be finely formed.

Modifications

Figure 7:
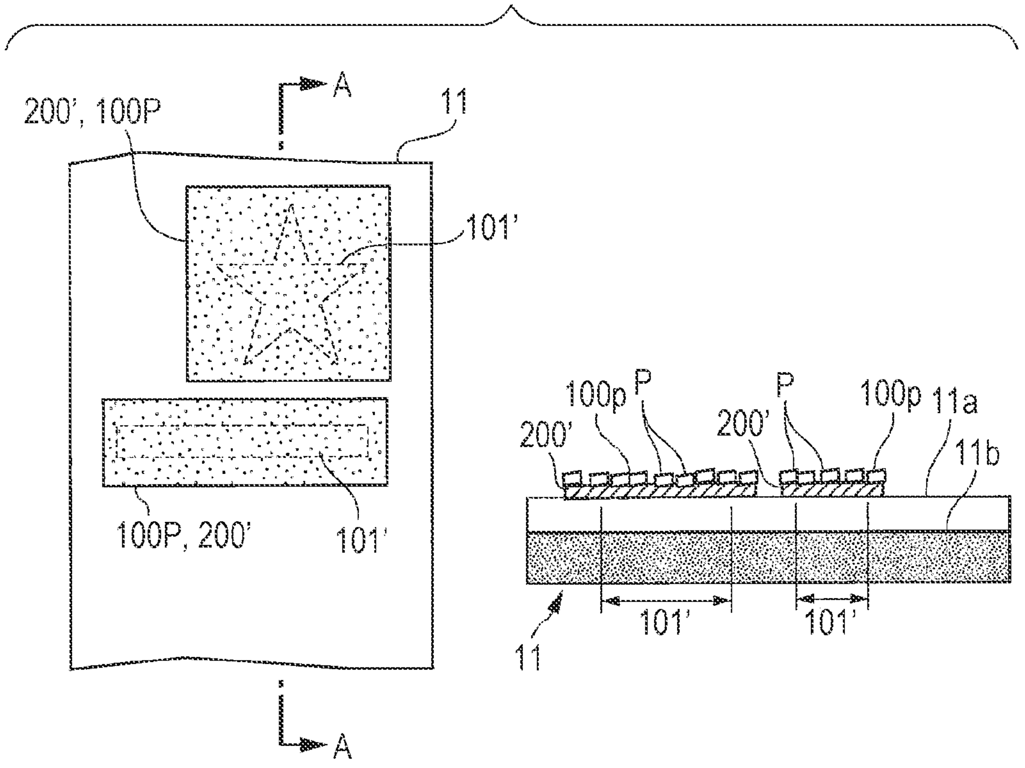
FIG. 7 is a diagram for explaining a modification of the first embodiment.

FIG. 7 is a view for describing a modification of the first embodiment, and is a view illustrating a modification of a powder holding pattern 200'. Referring to FIGS. 1 and 7, the powder holding pattern 200' formed on the side circumferential surface of the powder holding member 11 by the powder holding pattern forming apparatus 20 has an outer diameter shape slightly larger than a mirror image pattern 101' of the base pattern 101. That is, the powder pattern 100P held on the powder holding pattern 200' has a shape arranged slightly larger than the corresponding base pattern 101 in the nip part 10*a*.

As a result, in the nip part 10*a* between the powder holding member 11 and the transfer member 14, the powder holding pattern 200' holding the powder P is transferred to the entire area of the base pattern 101 even if the laminated state of the base pattern 101, the powder pattern 100P, and the powder holding pattern 200' does not completely match and deviates. As a result, it is possible to prevent generation of a portion where the powder P is not bonded in the base pattern 101.

Note that, in the nip part 10*a*, only the powder holding pattern 200' portion and the powder pattern 100P portion laminated on the base pattern 101 exhibiting adhesiveness by heating are transferred to the base pattern 101 side. The remaining portion of the powder holding pattern 200', that is, the powder pattern 100P portion, remains intact on the powder holding member 11 and is removed by the cleaning member 15. In addition, this modification is also applicable to each embodiment described below.

Second Embodiment

Figure 8:
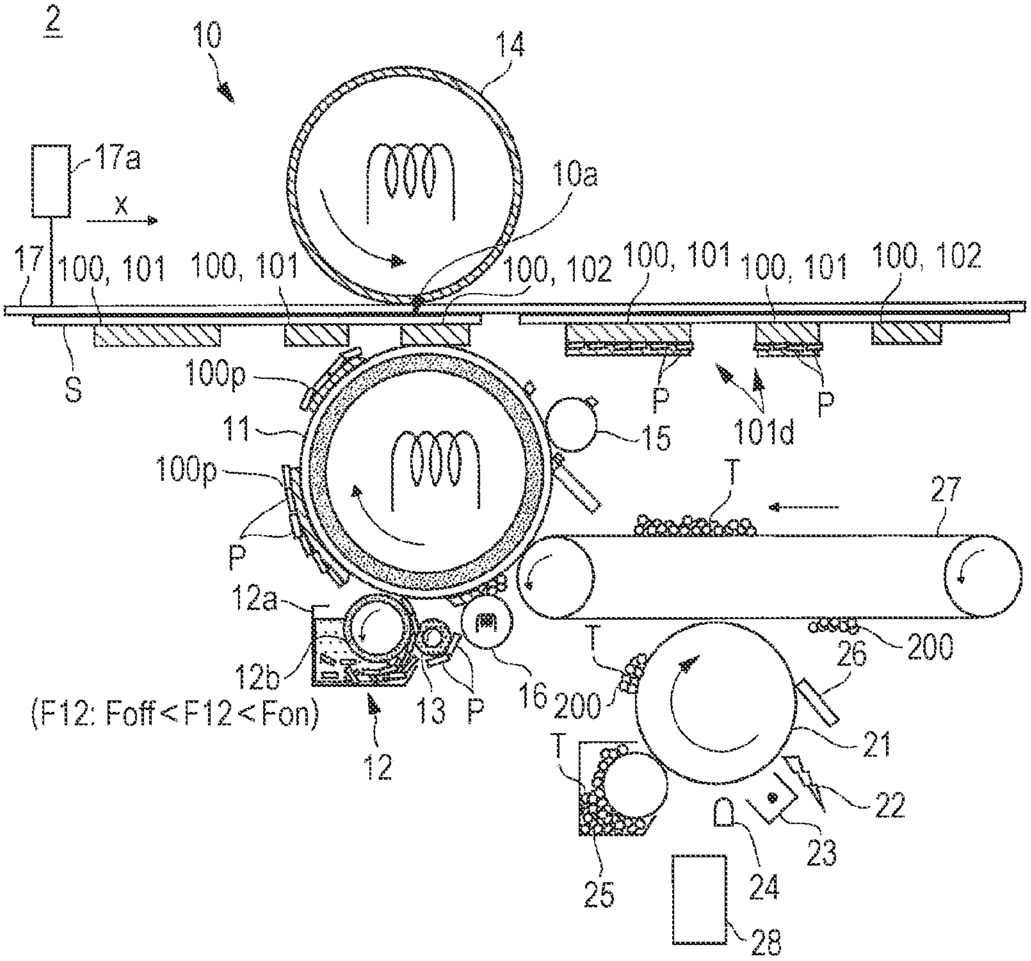
FIG. 8 is a configuration diagram of an image forming apparatus according to a second embodiment.

FIG. 8 is a configuration diagram of an image forming apparatus 2 according to a second embodiment. The image forming apparatus 2 of the second embodiment illustrated in this drawing is different from the image forming apparatus 1 of the first embodiment illustrated in FIG. 1 in the arrangement position of the rubbing member 13, and the other configurations are the same as those of the first embodiment, and thus overlapping detailed descriptions of the components are omitted.

That is, in the image forming apparatus 2 of the second embodiment, the rubbing member 13 is disposed so as to rub the side circumferential surface of the conveyance member 12*b* in the powder supply member 12. More specifically, the rubbing member 13 is disposed so as to rub the side circumferential surface of the conveyance member 12*b* on the downstream side of the storage container 12*a* and on the upstream side of the powder holding member 11 with respect to the rotation direction of the conveyance member 12*b*. As a result, the rubbing member 13 removes the excess powder P supplied from the storage container 12*a* to the side circumferential surface of the conveyance member 12*b*.

Figure 9:
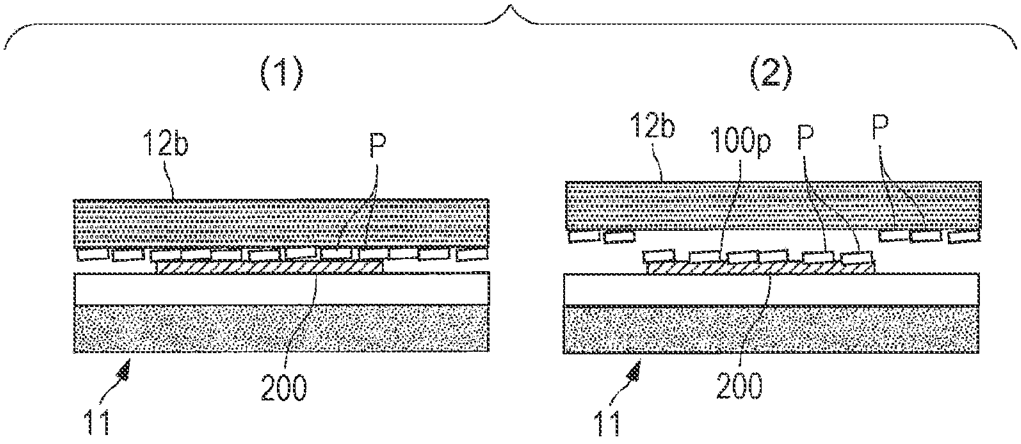
FIG. 9 is an enlarged cross-sectional view of a surface layer of a conveyance member in a powder holding member and a powder supply member in the second embodiment.

FIG. 9 is an enlarged cross-sectional view of the surface layer of the conveyance member 12*b* in the powder holding member 11 and the powder supply member 12 in the second embodiment. Referring to FIGS. 8 and 9, by the rubbing member 13 disposed as described above, the excess powder P is removed from the side circumferential surface of the conveyance member 12*b*, and the powder P oriented along the side circumferential surface remains on the side circumferential surface of the conveyance member 12*b* (see FIG. 9(1) for the above).

Therefore, at the nip part between the powder holding member 11 and the conveyance member 12*b*, the powder P in the already oriented state is transferred to the powder holding pattern 200 nipped at the nip part (see FIG. 9(2) for the above).

The image forming method by the image forming apparatus 2 described above is performed similarly to the image forming method described in the first embodiment.

Effects of Second Embodiment

Even in the second embodiment, the powder pattern 100P made of the powder P is formed in a shape corresponding to the base pattern 101 in the image pattern 100, and the powder pattern 100P is bonded to the base pattern 101. Therefore, similarly to the first embodiment, the powder P can be prevented from adhering to the background of the decorative pattern 101*d* to which the powder P is pasted, and the decorative image having the decorative pattern 101*d* can be finely formed. Note that the second embodiment may be combined with the first embodiment, and in the case of the combining, a rubbing member for rubbing the side circumferential surface of the powder holding member 11 may be additionally provided on the downstream side of the powder supply member 12 and on the upstream side of the nip part 10*a* in the rotation direction of the powder holding member 11.

Third Embodiment

Figure 10:
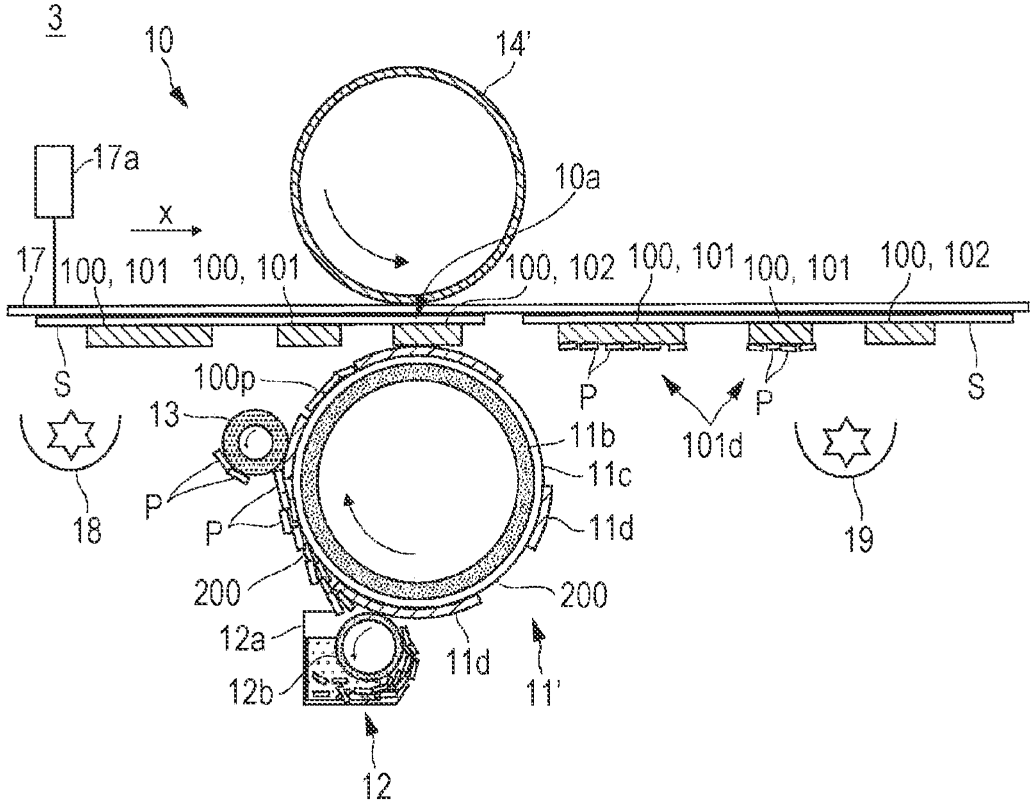
FIG. 10 is a configuration diagram of an image forming apparatus according to a third embodiment.

FIG. 10 is a configuration diagram of an image forming apparatus 3 according to a third embodiment. The image forming apparatus 3 of the third embodiment illustrated in this drawing is different from the image forming apparatus 1 of the first embodiment illustrated in FIG. 1 in that the powder holding pattern forming apparatus 20 is not provided and only the powder pasting apparatus 10 is provided. Accordingly, the configuration of a powder holding member 11' and a transfer member 14' of the powder pasting apparatus 10 is different, and light irradiation members 18 and 19 are provided as additional configurations. Hereinafter, the same components as those of the image forming apparatus 1 of the first embodiment will be denoted by the same reference numerals, and the image forming apparatus 3 of the third embodiment will be described while redundant detailed descriptions of the same components are omitted.

<Powder Pasting Apparatus 10>

The overall configuration of the powder pasting apparatus 10 is similar to that of the first embodiment, and the powder P is pasted to the image pattern 100 formed in advance on the main surface of the recording medium S to form the decorative pattern 101*d*, and a decorative image having the decorative pattern 101*d* is formed on the main surface of the recording medium S. Here, it is assumed that at least the base pattern 101 of the image pattern 100 formed in advance on the main surface of the recording medium S is constituted by a photocurable resin such as a UV curable ink. The base pattern 101 is formed by a UV inkjet apparatus.

[Powder Holding Member 11']

The powder holding member 11' is cylindrical and rotates about a cylindrical shaft by a drive motor. In addition, the powder holding member 11' constitutes the nip part 10*a* that pressurizes and sandwiches the recording medium S together with the conveyance path 17 with the transfer member 14'. Such a powder holding member 11' has the powder holding pattern 200 on the cylindrical side circumferential surface, and holds the powder P described below by adhering the powder P to the powder holding pattern 200. Note that the powder holding member 11' does not need to include a heating mechanism.

Figure 11:
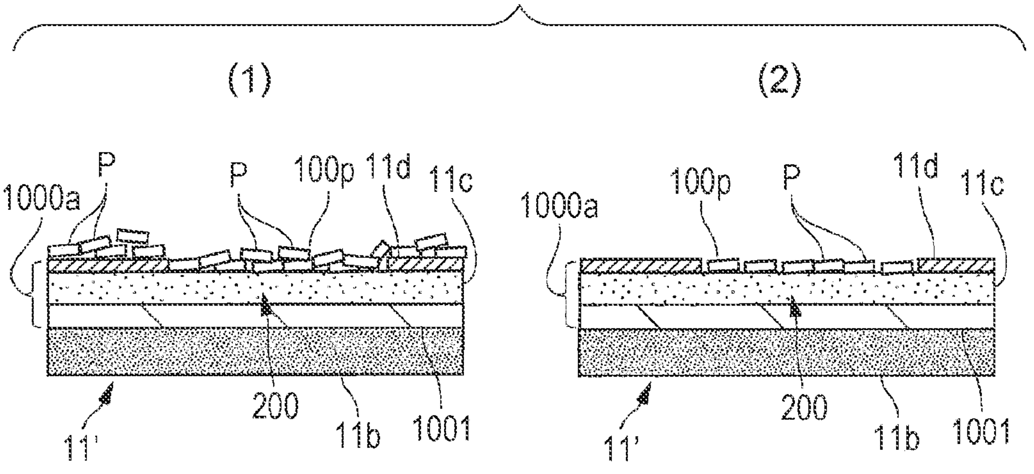
FIG. 11 is an enlarged cross-sectional view of a surface layer of a powder holding member in the third embodiment.

FIG. 11 is an enlarged cross-sectional view of a surface layer of the powder holding member 11' in the third embodiment, and is an enlarged cross-sectional view of a surface layer of the side circumferential surface of the cylindrical powder holding member 11'. As illustrated in this figure, the surface layer of the powder holding member 11' has a laminated structure of an elastic layer 11*b* and an adhesive layer 11*c* on the elastic layer 11*b*. In addition, a non-adhesive film 11*d* is patterned on the upper portion of the adhesive layer 11*c*, and an exposed portion of the adhesive layer 11*c* exposed from the non-adhesive film 11*d* is the powder holding pattern 200. Next, the configuration of each layer will be described with reference to FIGS. 10 and 11.

The elastic layer 11*b* is a layer for causing the side circumferential surface of the powder holding member 11 to follow the surface of the recording medium S in the nip part 10*a* described above. Such an elastic layer 11*b* is preferably constituted by a material having heat resistance, and is a layer using, for example, urethane rubber or silicone rubber.

The adhesive layer 11*c* is a layer for holding the powder P by adhesion. The adhesive layer 11*c* is provided on the surface of the sheet-like base material 1001 illustrated only in FIG. 11, constitutes a pattern sheet 1000*a* together with the base material 1001, and is wound around the outside of the elastic layer 11*b*. Such an adhesive layer 11*c* is constituted by using a material selected from, for example, a rubber-based adhesive, an acryl-based adhesive, a silicone-based adhesive, an emulsion-based adhesive, and a hot-melt-based adhesive. The base material 1001 is made of, for example, a PET resin.

The powder holding pattern 200 constituted by the adhesive layer 11*c* holds the powder P supplied to the side circumferential surface of the powder holding member 11' by the powder supply member 12 by adhesion to form the powder pattern 100P constituted by the powder P (see FIG. 11(1)). In addition, the upper powder P of the powder P laminated and held in a plurality of layers with respect to the powder holding pattern 200 is removed by rubbing the side circumferential surface of the powder holding member 11' by the rubbing member 13. The powder P remaining on the powder holding pattern 200 after rubbing by the rubbing member 13 is the powder P constituting the powder pattern 100P, and is oriented along the surface of the powder holding pattern 200 (see FIG. 11(2) for the above).

The non-adhesive film 11*d* is a layer pasted to the adhesive layer 11*c*. The non-adhesive film 11*d* is a layer for preventing an image offset in which the image pattern 100 on the recording medium S adheres to the powder holding member 11' side in the nip part 10*a* sandwiching the recording medium S between the powder holding member 11' and the transfer member 14'. The non-adhesive film 11*d* is also a layer for preventing adhesion of the powder P, and exhibits weak adhesion force [Foff] to the powder P.

As a result, the powder P (see FIG. 11(1)) adhering to the non-adhesive film 11*d* by the supply from the powder supply member 12 is removed from the non-adhesive film 11*d* by rubbing by the rubbing member 13 (see FIG. 11(2)).

Such a non-adhesive film 11*d* is provided on the surface of the sheet-like base material 1001 illustrated only in FIG. 11 with the adhesive layer 11*c* interposed therebetween, and constitutes the pattern sheet 1000*a* together with the base material 1001 and the adhesive layer 11*c*. The non-adhesive film 11*d* is made of, for example, a polyethylene terephthalate (PET) resin.

In particular, on the side circumferential surface of the powder holding member 11', the powder holding pattern 200 has a pattern shape corresponding to the base pattern 101 formed on the recording medium S. Here, "corresponding" means an inverted pattern of a pattern shape and arrangement obtained by inverting the recording medium S in the width direction perpendicular to the conveyance direction x of the recording medium S supplied to the nip part 10*a*, and means a mirror image.

Next, a method of forming the powder holding pattern 200 on the side circumferential surface of the powder holding member 11' as described above will be described.

Figure 12:
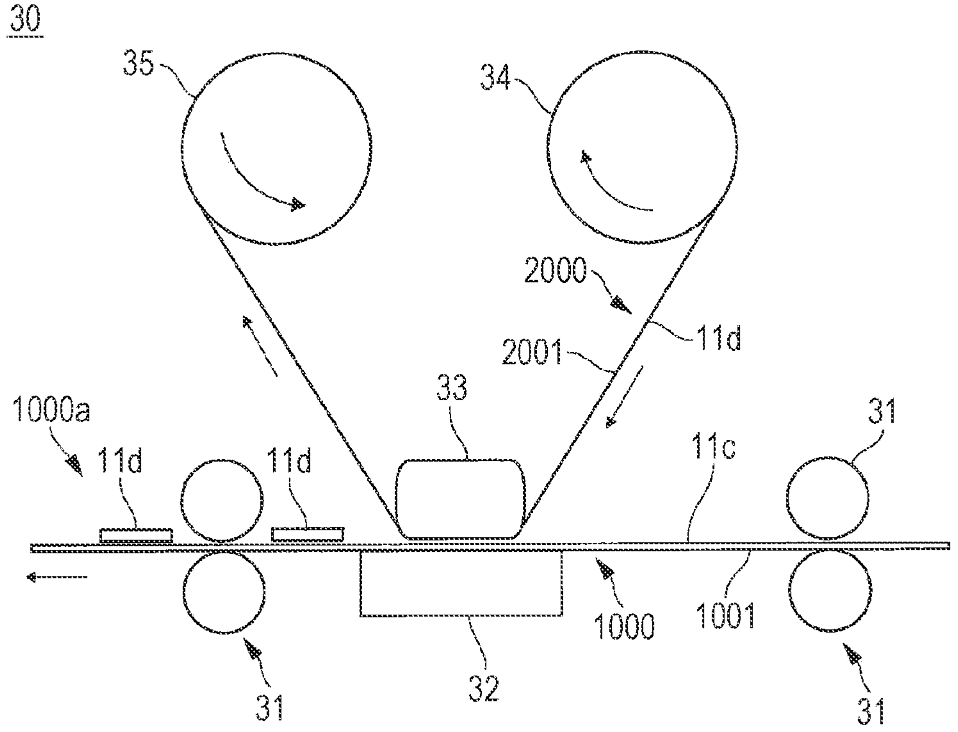
FIG. 12 is a view illustrating a pattern sheet manufacturing apparatus used in an image forming apparatus according to the third embodiment.

FIG. 12 is a view illustrating a manufacturing apparatus 30 of the pattern sheet 1000*a* used in the image forming apparatus of the third embodiment. As illustrated in FIG. 12, the manufacturing apparatus 30 includes a plurality of pairs of conveyance rollers 31 for conveying a first sheet member 1000. A stage 32 that supports the first sheet member conveyed by the conveyance rollers 31 and a thermal head 33 that freely heats the first sheet member 1000 by sandwiching the first sheet member 1000 with the stage 32 are also provided.

Further, the manufacturing apparatus 30 includes an unwinding roller 34 of the second sheet member 2000 and a winding roller 35 of the second sheet member 2000 unwound from the unwinding roller 34. The second sheet member 2000 between the unwinding roller 34 and the winding roller 35 is sandwiched between the stage 32 and the thermal head 33 on the thermal head 33 side of the first sheet member 1000. In addition, the conveying speed of the second sheet member 2000 by the unwinding roller 34 and the winding roller 35 is substantially the same as the conveying speed of the first sheet member 1000 by the conveyance rollers 31.

Figure 13:
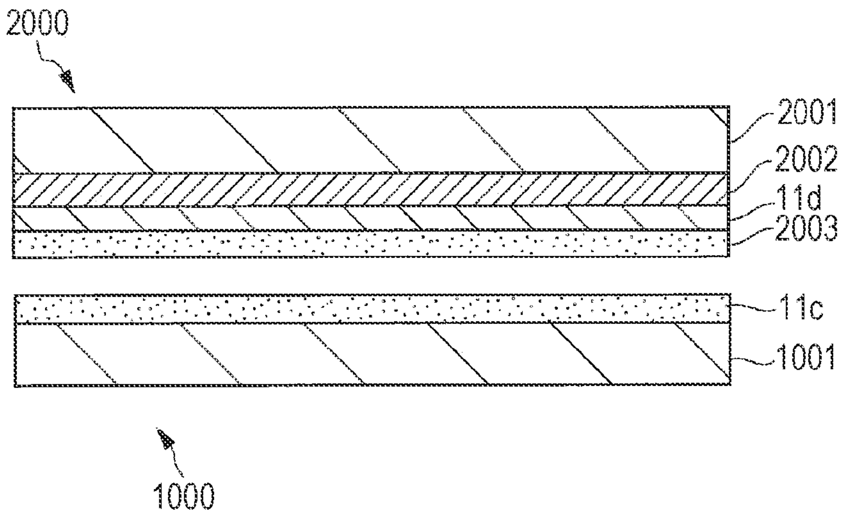
FIG. 13 is a cross-sectional view illustrating a configuration of a sheet member used for manufacturing a pattern sheet.

FIG. 13 is a cross-sectional view illustrating configurations of the first sheet member 1000 and the second sheet member 2000 used for manufacturing the pattern sheet (see FIG. 11). As illustrated in this drawing, the first sheet member 1000 has a configuration in which one main surface of the sheet-like base material 1001 is covered with the adhesive layer 11*c*. The sheet-like base material 1001 and the adhesive layer 11*c* constitute the pattern sheet 1000*a*.

The second sheet member 2000 has a configuration in which a peeling layer 2002, the non-adhesive film 11*d*, and an adhesive layer 2003 are laminated in this order on one main surface of the sheet-like base material 2001. The sheet-like base material 2001 is made of, for example, a PET resin. The peeling layer 2002 is, for example, a layer using a fluororesin. Further, the non-adhesive film 11*d* constitutes the pattern sheet 1000*a*. The adhesive layer 2003 may be the same as the adhesive layer 11*c* on the first sheet member 1000 side.

The manufacturing of the pattern sheet 1000*a* using such a first sheet member 1000 and second sheet member 2000 will be described with reference to FIGS. 12 and 13. First, the first sheet member 1000 and the second sheet member 2000 are set in the manufacturing apparatus 30, and the first sheet member 1000 and the second sheet member 2000 are sandwiched between the stage 32 and the thermal head 33 in a laminated state. At this time, the first sheet member 1000 is set between the stage 32 and the thermal head 33 such that the adhesive layer 11*c* faces the thermal head 33 side. In addition, the second sheet member 2000 is set between the stage 32 and the thermal head 33 such that the adhesive layer 2003 faces the stage 32 side.

In this state, the manufacturing apparatus 30 conveys the first sheet member 1000 and the second sheet member 2000 in the same direction and at the same speed between the stage 32 and the thermal head 33. At the same time, the manufacturing apparatus 30 controls heating in the thermal head 33. In the portion heated by the thermal head 33, the adhesive layer 11*c* of the first sheet member 1000 and the adhesive layer 2003 of the second sheet member 2000 are integrated by exhibiting adhesiveness.

In addition, the first sheet member 1000 and the second sheet member 2000 are conveyed in different conveyance directions after passing between the stage 32 and the thermal head 33. As a result, in the portion where the adhesive layer 2003 of the second sheet member 2000 and the adhesive layer 11*c* of the first sheet member 1000 are integrated, the non-adhesive film 11*d* is peeled off from the peeling layer 2002 of the second sheet member 2000 and transferred to the first sheet member 1000 side.

Figure 14:
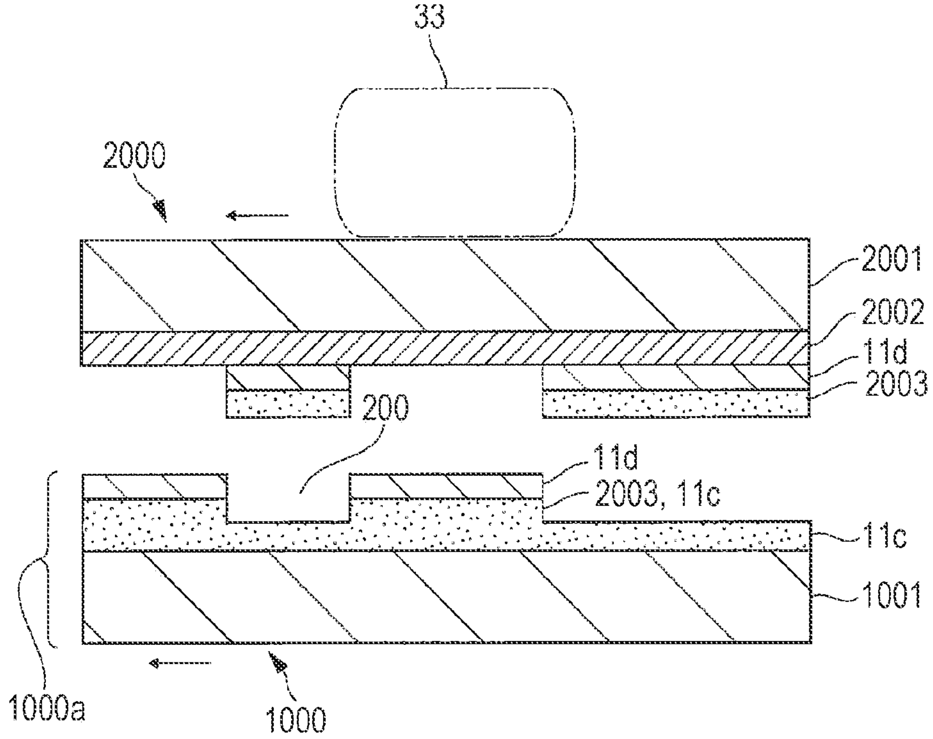
FIG. 14 is a cross-sectional view of a pattern sheet manufactured using the sheet member.

FIG. 14 is a cross-sectional view of the pattern sheet 1000*a* manufactured using the first sheet member 1000 and the second sheet member 2000. As illustrated in this drawing, in the pattern sheet 1000*a*, the non-adhesive film 11*d* transferred from the second sheet member 2000 by pressurization and heating by the thermal head 33 is pattern-formed on the adhesive layer 11*c* of the first sheet member 1000. Then, on the adhesive layer 11*c* of the first sheet member 1000, a portion exposed from the non-adhesive film 11*d* becomes the adhesive powder holding pattern 200, and the pattern sheet 1000*a* having the powder holding pattern 200 is formed. Note that the non-adhesive film 11*d* and the adhesive layer 2003 in a portion not heated by the thermal head 33 are left on the second sheet member 2000 side.

The pattern sheet 1000*a* manufactured in this way is wound around and fixed to the side circumferential surface of the powder holding member 11' illustrated in FIG. 10 with the elastic layer 11*b* interposed therebetween. For fixing the pattern sheet 1000*a* to the side circumferential surface of the powder holding member 11', for example, a gripping member (not illustrated) may be provided in the powder holding member 11' to grip the end portion of the pattern sheet 1000*a*. In addition, by constituting the elastic layer 11*b* serving as abase of the pattern sheet 1000*a* with low-hardness silicone rubber, the pattern sheet 1000*a* may be fixed to the side circumferential surface of the powder holding member 11' by the adhesive force of the silicone rubber. In this case, a special configuration for fixing the pattern sheet 1000*a* is not necessary, which is preferable.

[Transfer Member 14']

Returning to FIG. 10, the transfer member 14' is for transferring the powder P held on the powder holding pattern 200 on the powder holding member 11' to the base pattern 101 on the recording medium S. The transfer member 14' is different from the transfer member 14 (see FIG. 1) described in the first embodiment only in that the heating mechanism 140 is not provided.

[Light Irradiation Members 18 and 19]

The light irradiation members 18 and 19 irradiate the surface of the recording medium S on which the image pattern 100 is formed with light to cure the base pattern 101 constituted by a photocurable resin and other image patterns 100. Such light irradiation members 18 and 19 are arranged on the upstream side and the downstream side of the nip part 10*a* between the powder holding member 11' and the transfer member 14' with respect to the conveyance direction x of the recording medium S.

The light irradiation member 18 disposed on the upstream side of the nip part 10*a* irradiates the recording medium S before being supplied to the nip part 10*a* with light to semi-cure the image pattern 100 on the recording medium S. Accordingly, in the nip part 10*a*, the image pattern 100 made of the photocurable resin is prevented from being transferred to the powder holding member 11' side.

In addition, the image pattern 100 on the recording medium S is cured by irradiating the recording medium S that has passed through the light irradiation member 19 and the nip part 10*a* arranged on the downstream side of the nip part 10*a* with light. Thus, the powder P transferred to the base pattern 101 in the nip part 10*a* is reliably fixed to the base pattern 101.

<Powder Pasting Method and Image Forming Method>

Next, an image forming method according to the third embodiment will be described. The image forming method of the third embodiment described here is an image forming method performed by the image forming apparatus 3 described with reference to FIGS. 10 to 14, and is performed as follows.

First, the powder holding pattern 200 is arranged on the elastic layer 11*b* on the side circumferential surface of the powder holding member 11'. Here, for example, the powder holding pattern 200 is arranged on the elastic layer 11*b* by winding and fixing the pattern sheet 1000*a* illustrated in FIG. 14 on the elastic layer 11*b*. The powder holding pattern 200 corresponds to the base pattern 101 to which the powder P is pasted by the image forming apparatus 3 of the image pattern 100 formed in advance on the recording medium S. Corresponding means as described in the first embodiment, and means an inverted pattern of a pattern shape and arrangement obtained by inverting the recording medium S in the width direction perpendicular to the conveyance direction x of the recording medium S, and means a mirror image.

Next, the powder holding member 11' holding the powder holding pattern 200 on the side circumferential surface is rotated in a predetermined direction to convey the powder holding pattern 200 to the arrangement portion of the powder supply member 12. The powder supply member 12 supplies the powder P to the powder holding pattern 200 conveyed by the powder holding member 11'. As a result, the powder P is held on the powder holding pattern 200, and the powder pattern 100P constituted by the powder P is formed (see FIG. 11(1)).

Thereafter, the powder holding member 11' conveys the powder holding pattern 200 holding the powder P to the arrangement portion of the rubbing member 13. As a result, the rubbing member 13 rubs the powder holding pattern 200 holding the powder P, and removes the upper powder P of the powder P held on the powder holding pattern 200. As a result, the powder P held on the powder holding pattern 200 and constituting the powder pattern 100P is oriented along the surface of the powder holding pattern 200. Further, the powder P adhering to the non-adhesive film 11*d* of the powder holding member 11' is removed by rubbing by the rubbing member 13. (See FIG. 11(2)).

In addition, the powder holding member 11' conveys the powder holding pattern 200 carrying the powder P in an oriented state to the nip part 10*a* with the transfer member 14'.

On the other hand, the conveyance control unit 17*a* of the conveyance path 17 conveys the recording medium S on which the image pattern 100 is formed to the nip part 10*a* at a predetermined timing in accordance with the conveyance of the powder holding pattern 200 by the powder holding member 11'. Here, the predetermined timing is a timing at which each base pattern 101 formed on the recording medium S and each powder holding pattern 200 and powder pattern 100P formed on the powder holding member 11' corresponding to the base pattern 101 are laminated at the nip part 10*a*. The conveyance control unit 17*a* of the conveyance path 17 controls the timing of conveyance of the recording medium S as described above on the basis of, for example, a signal from a sensor provided in the powder holding member 11'.

In such a conveyance direction of the recording medium S, the light irradiation member 18 disposed on the upstream side of the nip part 10*a* semi-cures the base pattern 101 constituted by the photocurable resin. Then, the base pattern 101 exhibiting adhesiveness by semi-curing is conveyed to the nip part 10*a*.

The nip part 10*a* pressurizes the recording medium S conveyed by the conveyance path 17 and the powder holding pattern 200 on which the powder P is carried in an oriented state on the outer circumferential surface of the powder holding member 11. As a result, the powder P held in an oriented state on the powder holding pattern 200 is pressure-bonded and transferred to the base pattern 101 made of the semi-cured photocurable resin.

Thereafter, in the conveyance direction of the recording medium S, the base pattern 101 to which the powder P has been transferred is cured in the nip part 10*a* by light irradiation from the light irradiation member 19 disposed on the downstream side of the nip part 10*a*. As a result, the holding state of the powder P with respect to the base pattern 101 is fixed.

As described above, the decorative pattern 101*d* in which the powder P is pasted to the base pattern 101 of the image pattern 100 formed on the recording medium S is formed, and a decorative image having the decorative pattern 101*d* is obtained.

Effects of Third Embodiment

Even in the third embodiment, the powder pattern 100P made of the powder P is formed in a shape corresponding to the base pattern 101 in the image pattern 100, and the powder pattern 100P is bonded to the base pattern 101. Therefore, similarly to the first embodiment, the powder P can be prevented from adhering to the background of the decorative pattern 101*d* to which the powder P is pasted, and the decorative image having the decorative pattern 101*d* can be finely formed. Note that the third embodiment may be combined with the second embodiment, and in the case of combining, an additional rubbing member may be provided in the powder supply member 12.

Fourth Embodiment

Figure 15:
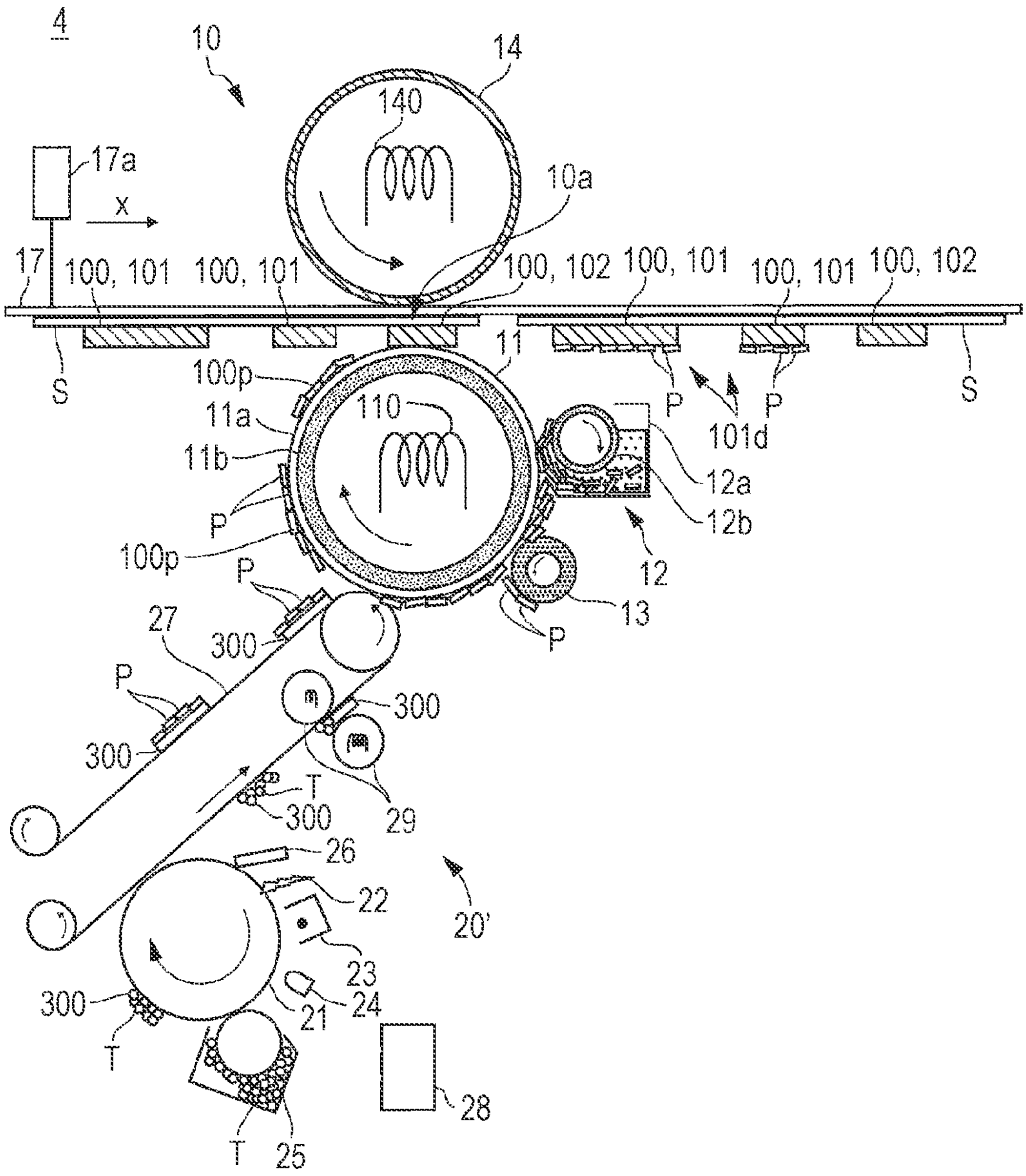
FIG. 15 is a configuration diagram of an image forming apparatus according to a fourth embodiment.

FIG. 15 is a configuration diagram of an image forming apparatus 4 according to a fourth embodiment. The image forming apparatus 4 of the fourth embodiment illustrated in this drawing is different from the image forming apparatus 1 of the first embodiment illustrated in FIG. 1 in that a powder removal pattern forming apparatus 20' is provided instead of the powder holding pattern forming apparatus 20. Other configurations are similar to those of the image forming apparatus 1 of the first embodiment, and thus, description thereof is omitted here.

<Powder Removal Pattern Forming Apparatus 20'>

The powder removal pattern forming apparatus 20' is an apparatus for forming a powder removal pattern 300 for removing powder from the side circumferential surface of the powder holding member 11 by adhesion, and is, for example, an electrophotographic image forming apparatus for forming a toner pattern as the powder removal pattern 300.

Such a powder removal pattern forming apparatus 20' includes a photosensitive drum 21, a resetting unit 22, a charging unit 23, an exposure unit 24, a developing unit 25, a cleaning unit 26, a transfer belt 27, and a control unit 28 as a calculator, and forms the powder removal pattern 300 made of an aggregate of toner particles T on the outer circumferential surface of the transfer belt 27. In addition, the transfer belt 27 is not an endless belt but a winding belt, and the moving direction of the transfer belt 27 is a direction opposite to the rotation direction of the powder holding member 11.

Such a powder removal pattern forming apparatus 20' is disposed so as to bring the transfer belt 27 into contact with the side circumferential surface of the powder holding member 11 downstream of the rubbing member 13 and upstream of the nip part 10*a* with respect to the rotation direction of the powder holding member 11 in the powder pasting apparatus 10. On the side circumferential surface of the powder holding member 11, a release layer 11*a* is provided on the upper portion of the elastic layer 11*b*, and the side on which the powder removal pattern 300 is formed on the transfer belt 27 is brought into contact with the release layer 11*a*.

In addition, the powder removal pattern forming apparatus 20' includes a fixing member 29 on the downstream side of the photosensitive drum 21 and on the upstream side of the powder holding member 11 with respect to the moving direction of the transfer belt 27. The fixing member 29 heats and pressurizes the powder removal pattern 300 constituted by toner particles with the transfer belt 27. As a result, the toner particles constituting the powder removal pattern 300 are softened to have a film shape exhibiting adhesiveness.

Note that the detailed description of the configuration of the electrophotographic image forming apparatus will be omitted here. However, the control unit 28 controls each unit of the powder removal pattern forming apparatus 20' so that the powder removal pattern 300 having a shape corresponding to the base pattern 101 formed on the recording medium S is formed in accordance with the timing of conveyance of the recording medium S by the conveyance path 17 of the powder pasting apparatus 10. The control unit 28 controls the formation of the powder removal pattern 300 in the same manner as in the first embodiment.

<Powder Pasting Method and Image Forming Method>

Next, an image forming method according to a fourth embodiment will be described. The image forming method described here is an image forming method performed by the image forming apparatus 4 described with reference to FIG. 15, and is performed as follows. First, the control unit 28 of the powder holding pattern forming apparatus 20 acquires data related to an image pattern formed on the recording medium S. Then, the control unit 28 of the powder removal pattern forming apparatus 20' forms the powder removal pattern 300 having a shape corresponding to the base pattern 101 on the outer circumferential surface of the transfer belt 27 based on the data related to the base pattern 101 in the image pattern 100.

Here, the powder removal pattern 300 having a shape corresponding to the base pattern 101 is an inverted pattern of the base pattern 101 and is a cut pattern obtained by cutting out the base pattern. Other than that, the powder removal pattern 300 is formed on the outer circumferential surface of the transfer belt 27 as in the first embodiment.

As described above, the powder removal pattern 300 made of the toner pattern formed on the outer circumferential surface of the transfer belt 27 exhibits adhesiveness by passing through the fixing member 29, and is supplied to the side circumferential surface of the powder holding member 11 as the transfer belt 27 moves. Then, the powder P held on the side circumferential surface of the powder holding member 11 rotating in the direction opposite to the transfer belt 27 is transferred to the powder removal pattern 300 formed on the transfer belt 27 and removed from the side circumferential surface of the powder holding member 11. As a result, the powder pattern 100P constituted by powder is formed on the side circumferential surface of the powder holding member 11.

Here, the powder P supplied from the powder supply member 12 is held on the side circumferential surface of the powder holding member 11 in an oriented state by rubbing by the rubbing member 13. Therefore, the powder P left on the powder holding member 11 constitutes the powder pattern 100P in an oriented state along the side circumferential surface of the powder holding member 11. At this time, the powder pattern 100P constituted by the powder P left on the side circumferential surface of the powder holding member 11 is a mirror image pattern having a pattern shape and arrangement in which the recording medium S is inverted in the width direction perpendicular to the conveyance direction x of the recording medium S.

Thereafter, the powder holding member 11 conveys the powder pattern 100P left on the side circumferential surface to the nip part 10*a* with the transfer member 14.

On the other hand, the conveyance control unit 17*a* of the conveyance path 17 conveys the recording medium S on which the image pattern 100 is formed to the nip part 10*a* at a predetermined timing in accordance with the conveyance of the powder pattern 100P by the powder holding member 11. Here, the predetermined timing is a timing at which each base pattern 101 formed on the recording medium S and each powder pattern 100P formed on the powder holding member 11 corresponding to the base pattern 101 are laminated at the nip part 10*a*. The conveyance control unit 17*a* of the conveyance path 17 controls the timing of conveyance of the recording medium S as described above on the basis of, for example, a signal from the control unit 28 of the powder holding pattern forming apparatus 20.

The nip part 10*a* pressurizes the recording medium S conveyed by the conveyance path 17 and the powder pattern 100P constituted by the powder P oriented on the outer circumferential surface of the powder holding member 11 in a heated state. As a result, the image pattern 100 including the base pattern 101 constituted by the toner also exhibits adhesiveness, and the powder P constituting the powder pattern 100P on the powder holding member 11 side is transferred to the base pattern 101 side exhibiting adhesiveness.

As described above, the decorative pattern 101*d* in which the powder P is pasted to the base pattern 101 of the image pattern 100 formed on the recording medium S is formed, and a decorative image having the decorative pattern 101*d* is obtained. Note that, since the image pattern 100 including the base pattern 101 on the recording medium S is cured by lowering the temperature after passing through the nip part 10*a*, the adhesive property is exhibited by curing, and the powder P is adhered and held to the base pattern 101, which is similar to the first embodiment.

Effects of Fourth Embodiment

Even in the fourth embodiment, the powder pattern 100P made of the powder P is formed in a shape corresponding to the base pattern 101 in the image pattern 100, and the powder pattern 100P is bonded to the base pattern 101. Therefore, similarly to the first embodiment, the powder P can be prevented from adhering to the background of the decorative pattern 101*d* to which the powder P is pasted, and the decorative image having the decorative pattern 101*d* can be finely formed. Note that the fourth embodiment may be combined with the second embodiment, and in the case of combining, an additional rubbing member may be provided in the powder supply member 12.

EXAMPLES

Next, Examples and Comparative Examples to which the present invention is applied will be described. Note that the configurations of Examples and Comparative Examples are illustrated in Table 1 below.

Comparative Example (see FIG. 1)

<Decorative Image Forming Procedure>

The non-decorative pattern 102 constituted by the dye ink was formed on the recording medium S by the inkjet apparatus. Next, the base pattern 101 constituted by black toner was formed on the recording medium S by the electrophotographic printing apparatus. The base pattern 101 and the non-decorative pattern 102 formed here are a non-decorative pattern 102 constituted by abase pattern 101 of a star mark (101*s*) and a thin line (100*sl*) and text as illustrated in FIG. 3.

Thereafter, in a powder pasting apparatus having the following conventional configuration, a decorative pattern 101*d* in which powder P was pasted to the base pattern 101 was formed. At this time, the powder P held in an oriented state on the entire side circumferential surface of the powder holding member 11 was pasted on the base pattern 101. Hereinafter, a detailed configuration will be described.

<Configuration of Recording Medium S>

Recording medium S: 209 g/m$^2$ of marshmallow CoC paper manufactured by Heiwa Paper Co., Ltd.

<Formation of Non-Decorative Pattern 102>

Inkjet printing apparatus (EP-881 AW manufactured by Seiko Epson Corporation): dye ink <Formation of Base Pattern 101>

Electrophotographic printing apparatus (AccurioPress C6020 manufactured by KONICA MINOLTA, INC.): monochrome mode (black toner is used)

<Configuration of Powder Pasting Apparatus>

The apparatus described in JP 2020-095209 A used a powder pasting apparatus (see FIG. 1) that holds powder in an oriented state on the entire side circumferential surface of the powder holding member 11.

[Powder Holding Member 11]

Roller having a diameter of 100 mm (manufactured by NISSEI ELECTRIC CO., LTD.): speed 100 mm/sec Side circumferential surface of the powder holding member 11: a silicone rubber layer (manufactured by SWCC SHOWA HOLDINGS CO., LTD.) having a thickness of 2 mm and a rubber hardness of 30° (Asker A)

[Powder Supply Member 12]

Conveyance member 12*b*: a roller having a diameter of 20 mm (manufactured by NISSEI ELECTRIC CO., LTD.): a speed of 30 mm/sec (in the same direction (width) as the powder holding member 11): a pushing amount of 0.5 mm with respect to the powder holding member 11

Side circumferential surface of the conveyance member 12*b*: a silicone rubber layer (manufactured by SWCC SHOWA HOLDINGS CO., LTD.) having a thickness of 3 mm and a rubber hardness of 450 (Asker C)

Regulating member of conveyance member 12*b*: regulating blade: thickness 0.1 mm: made of stainless steel Rubbing member 13: a roller having a diameter of 20 mm (manufactured by NISSEI ELECTRIC CO., LTD.): a speed of 200 mm/sec (in a direction opposite to the powder holding member 11 (counter)): a pushing amount of 0.2 mm with respect to the powder holding member 11

[Rubbing Member 13]

Side circumferential surface: a silicone foam layer (aquacell) having a thickness of 3 mm and a hardness of 40° (Asker C)

[Transfer Member 14]

Roller having a diameter of 80 mm (manufactured by SWCC SHOWA HOLDINGS CO., LTD.): a speed of 100 mm/sec (in the same direction (width) as the powder holding member 11): a pressure of 120 kPa between the roller and the powder holding member 11

Side circumferential surface: a silicone rubber layer (manufactured by SWCC SHOWA HOLDINGS CO., LTD.) having a thickness of 2 mm and a rubber hardness of 19° (Asker C), and a conductive PFA coating layer having a thickness of 30 μm on the surface

[Heating Mechanisms 110 and 140]

Halogen lamp (manufactured by Ushio Inc.): surface temperature of the powder holding member 11 130° C.: surface temperature of the transfer member 14 140° C.

[Powder P]

LG neo #325 (Silver: manufactured by OIKE & Co., Ltd.)

<Formation of Decorative Pattern 101*d*>

Using the powder P having the above configuration, the powder P held in an oriented state on the entire side circumferential surface of the powder holding member 11 was pasted on the base pattern 101 to form the decorative pattern 101*d*.

Example 1 (see FIG. 1)

<Decorative Image Forming Procedure>

A non-decorative pattern 102 constituted by toner was formed on the recording medium S by the color mode of the electrophotographic printing apparatus. Next, abase pattern 101 constituted by black toner was formed on the recording medium S in the monochrome mode of the electrophotographic printing apparatus. The base pattern 101 and the non-decorative pattern 102 formed here are the same as those in the comparative example, and are the non-decorative pattern 102 constituted by the base pattern 101 of the star mark (101*s*) and the thin line (100*sl*) and text as illustrated in FIG. 3.

Thereafter, in the following powder pasting apparatus, a decorative pattern 101*d* in which the powder P was pasted to the base pattern 101 was formed. Hereinafter, a detailed configuration will be described.

<Configuration of Recording Medium S>

Recording medium S: 209 g/m$^2$ of marshmallow CoC paper manufactured by Heiwa Paper Co., Ltd.

<Formation of Non-Decorative Pattern 102>

Electrophotographic printing apparatus (AccurioPress C6020 manufactured by KONICA MINOLTA, INC.): Color mode <Formation of Base Pattern 101>

Electrophotographic printing apparatus (AccurioPress C6020 manufactured by KONICA MINOLTA, INC.): monochrome mode (black toner is used)

<Configuration of Powder Pasting Apparatus 10>

A powder pasting apparatus 10 configured as follows was used.

[Powder Holding Member 11]

The powder holding pattern 200 was formed on an OHP film for an LBP printer (CG3500 manufactured by 3M Company) by an electrophotographic printing apparatus.

Electrophotographic printing apparatus (AccurioPress C6020 manufactured by KONICA MINOLTA, INC.): monochrome mode (black toner is used)

Note that, as illustrated in FIG. 5, the powder holding pattern 200 is a star mark and a thin line corresponding to the base pattern 101.

Next, a silicone rubber sheet (manufactured by MISUMI Group Inc.) having a thickness of 2 mm and a rubber hardness of 50° (JISA) was bonded to a toner image (powder holding pattern 200) surface of the OHP film, and pressurized (120 kPa) on a hot plate heated to 180° C. As a result, the toner image (powder holding pattern 200) on the OHP film was transferred to the silicone rubber surface.

The silicone rubber sheet (rubber hardness: 50°) on which the powder holding pattern 200 was formed was wound around a core metal having a diameter of 96 mm to obtain a powder holding member 11 having a diameter of 100 mm.

The image forming apparatus 1 was operated by one rotation of the powder holding member 11 having a diameter of 100 mm without inputting the recording medium S. As a result, the powder P was supplied from the powder supply member 12 to the side circumferential surface of the powder holding member 11. In the powder P supplied from the powder supply member 12 to the side circumferential surface of the powder holding member 11, the powder P in contact with the powder holding pattern 200 constituted by the toner was held by the powder holding pattern 200. The powder P in contact with other silicone rubber sheet (rubber hardness: 50°) was held as it was by the conveyance member 12*b* constituted by a silicone rubber layer having a rubber hardness of 30° (Asker A) having a stronger adhesive force, and was not transferred to the powder holding member 11 side.

[Alternative Means of Rubbing Member 13]

The silicone rubber sheet holding the powder P on the powder holding pattern 200 was removed from the core metal, bonded to another silicone rubber sheet having a thickness of 2 mm and a rubber hardness of 50° (JISA), and then separated. As a result, slight excess powder particles adhering to the silicone rubber sheet removed from the core metal were removed, and a powder particle pattern in which no excess powder particles P adhered to the background portion deviated from the powder holding pattern 200 was formed.

[Powder Holding Member 11]

The silicone rubber sheet holding the powder P on the powder holding pattern 200 was wound around a core metal having a diameter of 96 mm to obtain a powder holding member 11 having a diameter of 100 mm again. In addition, the rubbing member 13 and the powder supply member 12 illustrated in FIG. 1 were removed from the periphery of the powder holding member 11. As a result, the portion extending from the rubbing member 13 in the rotation direction of the powder holding member 11 to the transfer member 14 was also reproduced.

<Formation of Decorative Pattern 101*d*>

As described above, the recording medium S was conveyed in the conveyance path 17 of the image forming apparatus 1 in a state in which the portion extending from the rubbing member 13 in the rotation direction of the powder holding member 11 to the transfer member 14 was also reproduced, and the powder holding member 11 was operated in accordance with the timing of conveyance. This timing is a timing at which the base pattern 101 formed on the recording medium S and the powder holding pattern 200 are nipped in a state of facing each other at the nip part 10*a*. As a result, the powder P held on the powder holding pattern 200 was pasted on the base pattern 101 to form a decorative pattern 101*d*.

Example 2 (see FIG. 1)

Example 2 is different from the procedure of Example 1 only in that the base pattern 101 and the non-decorative pattern 102 on the recording medium S are created in the same process. The base pattern 101 and the non-decorative pattern 102 were formed using an electrophotographic printing apparatus: AccurioPress C6020 (color mode) manufactured by KONICA MINOLTA, INC.

Example 3 (see FIG. 1)

Example 3 is different from Example 1 only in that, in the procedure of Example 1, the base pattern 101 and the non-decorative pattern 102 on the recording medium S are created in the same process, and a toner pattern slightly larger than the base pattern 101 is formed as the powder holding pattern 200 as illustrated in FIG. 7.

Example 4 to 6

In each of Example 4 to 6, in the procedure of Example 3, toners illustrated in Table 1 below were used as toners constituting the base pattern 101, the non-decorative pattern 102, and the powder holding pattern 200. However, in the formation of the powder holding pattern 200 of Example 4, a clear toner was prepared by a formulation in which a coloring pigment was removed from the toner. In addition, the image stabilization function of the electrophotographic printing apparatus (AccurioPress C6020 manufactured by KONICA MINOLTA, INC.) was turned off, and the image forming conditions were manually adjusted. As a result, the powder holding pattern 200 using the clear toner was formed under favorable conditions in which fogging to the background portion was the smallest and the adhesion amount was the largest while preventing erroneous detection when the clear toner was detected by the sensor for color toner.

TABLE 1

| | Non-decorative pattern | Base pattern | Adhesive pattern | Adhesive pattern type | Background portion powder adhesion | Number of pieces of image data | Thin line positional deviation | Thin line image formation |
|---|---|---|---|---|---|---|---|---|
| Comparative example | Ink | Black toner | — | — | Present | 2 | 0.5 mm or more | Favorable |
| Example 1 | Toner | Black toner | Black toner | FIG. 5 | Absent | 3 | 0.5 mm or more | Base exposure |
| Example 2 | Toner | Black toner | Black toner | FIG. 5 | Absent | 2 | 0.5 mm or less | Base exposure |
| Example 3 | Toner | Black toner | Black toner | FIG. 7 | Absent | 2 | 0.5 mm or less | Favorable |
| Example 4 | Toner | Black toner | Clear toner | FIG. 7 | Absent | 2 | 0.5 mm or less | Favorable |
| Example 5 | Toner | Black toner | Magenta toner | FIG. 7 | Absent | 2 | 0.5 mm or less | Favorable |
| Example 6 | Toner | Magenta toner | Magenta toner | FIG. 7 | Absent | 2 | 0.5 mm or less | Favorable |

Evaluation of Examples and Comparative Examples

The following evaluations were performed for Comparative Examples and Examples 1 to 6, and the evaluation results are illustrated in Table 1 above. Note that the number of pieces of image data in Table 1 is the number of pieces of image data created for printing the decorative image including the decorative pattern 101*d* and the non-decorative pattern 102.

[Evaluation of Background Portion Powder Particle Adhesion]

In the recording medium S, the adhesion of the powder P to the background portion where the decorative pattern 101*d* and the non-decorative pattern 102 were not present was evaluated.

Using a digital microscope VHX-6000 (manufactured by KEYENCE CORPORATION) as an evaluation apparatus, the background portion was observed using a mode of automatically acquiring and combining a plurality of screens. The image storage was stored at an angle of view of 5 mm×5 mm, binarized with image processing software attached to the apparatus, and then the number of powder particles included in the angle of view was automatically counted. The background portion powder particle adhesion number (unit: piece/$mm^2$) was calculated from the acquired number and field angle area.

As described above, the average value of the results at three points of each evaluation sample was calculated. When the calculated average value was less than the target 0.1 pieces/$mm^2$, it was evaluated as "background portion powder adhesion—absent", and when the calculated average value was more than the target pieces/$mm^2$, it was evaluated as "background portion powder adhesion—present".

[Evaluation of Thin Line Positional Deviation]

A distance [d] between a thin line (100*sl*) of the decorative pattern 101*d* illustrated in FIG. 6 and the non-decorative pattern 102 was measured with a metal bar. It was determined whether the deviation from the normal distance scheduled in the image data was ±0.5 mm or more or ±0.5 mm or less.

[Method for Evaluating Thin Line Image Formation]:

The pasted state of the powder P to the thin line (101*sl*) of the decorative pattern 101*d* illustrated in FIG. 6 was visually evaluated. When the decorative pattern 101*d* of the thin line (101*sl*) having metallic gloss was formed, it was determined as "good", and when the toner color of the base pattern 101 was exposed for all or a part of the thin line (101*sl*), it was determined as"base exposure".

Evaluation Results

As illustrated in Table 1, in the comparative example, the transfer of the powder P was confirmed in a part of the background. In addition, since the base pattern 101 and the non-decorative pattern 102 were formed by different apparatuses, a positional deviation considered to be a variation in sheet passage of the recording medium S in each apparatus occurred, and a deviation of 0.5 mm or more occurred at a position of the thin line (101*sl*) of the base pattern 101. However, since the powder P was held on the entire side circumferential surface of the powder holding member 11, the powder particle P could be pasted to the thin line (101*sl*) in which the positional deviation of 0.5 mm or more occurred without deviation, and the image of the thin line (101*sl*) was favorably formed.

In Example 1, the powder holding pattern 200 for holding the powder P was formed on the side circumferential surface of the powder holding member 11, and the powder P was not present in the portion corresponding to the background portion, so that the background portion powder adhesion achieved the target. Compared to the comparative example, image data for the powder holding pattern 200 was additionally required, and thus the number of image data was 3. In addition, for the same reason as in the comparative example, the thin line (101*sl*) of the base pattern 101 was displaced by 0.5 mm or more. Due to this deviation and the deviation between the base pattern 101 and the powder holding pattern 200 holding the powder P, the powder P could not be transferred to the thin line (101*sl*) of the base pattern 101, and the thin line image formation resulted in the base exposure.

In Example 2, since the base pattern 101 and the non-decorative pattern 102 were formed in the same process using the same electrophotographic printing apparatus, the number of pieces of image data could be reduced to 2, and the positional deviation of the thin line (101*sl*) was within the target. On the other hand, the base was exposed for image formation of the thin line (101*sl*). It is considered that the powder P could not be transferred to the thin line (101*sl*) due to the positional deviation between the base pattern 101 and the powder holding pattern 200 holding the powder P.

In Example 3, since the base pattern 101 and the non-decorative pattern 102 were formed in the same process using the same electrophotographic printing apparatus, the number of pieces of image data could be reduced to 2, and the positional deviation of the thin line (101*sl*) was within the target. In addition, since the powder holding pattern 200 had a shape slightly larger than the base pattern 101, the powder P could be pasted to the thin line (101*sl*) in the base pattern 101, and the thin line image formation was favorable.

In Example 4, in addition to the same evaluation as in Example 3, since the powder holding pattern 200 was formed with the clear toner, the powder P pasted to the base pattern 101 was not shielded by the pigment, and a highly glossy decorative pattern 101*d* was obtained.

In Example 5, in addition to the same evaluation as in Example 3, the powder holding pattern 200 was formed of magenta toner, so that a magenta metallic decorative pattern 101*d* was obtained.

In Example 6, in addition to the evaluation similar to that in Example 3, the powder holding pattern 200 was formed with the magenta toner having the same color as the base pattern 101, so that a metallic decorative pattern 101*d* having a more vivid magenta color was obtained.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:

a powder holding member that holds a powder pattern formed of a powder and corresponding to an image pattern, the powder pattern being on a surface of the powder holding member and the image pattern being formed on a recording medium in advance;

a transfer member that constitutes a nip part for nipping the recording medium, on which the image pattern is formed, with the powder holding member, and pastes the powder constituting the powder pattern to the image pattern at the nip part;

a powder supply member that supplies powder to the surface of the powder holding member, the powder supply member transfers the powder held on a conveyance member to the surface of the powder holding member; and an adhesion force of the powder to the conveyance member of the powder supply member is smaller than an adhesion force of the powder to a part where the powder pattern is formed on the surface of the powder holding member, and is larger than an adhesion force of the powder to a part where the powder pattern is not formed on the surface of the powder holding member.

2. The image forming apparatus according to claim 1, wherein the powder pattern has a shape arranged slightly larger than the image pattern at the nip part.

3. The image forming apparatus according to claim 1, wherein a base pattern to which the powder is pasted and a non-decorative pattern to which the powder is not pasted are formed as the image pattern on the recording medium, and the powder holding member holds the powder in a pattern shape corresponding to the base pattern in the image pattern.

4. The image forming apparatus according to claim 3, wherein the base pattern and the non-decorative pattern are formed in a same process.

5. The image forming apparatus according to claim 1, further comprising:

a rubbing member that rubs the surface of the powder holding member covered with the powder supplied from the powder supply member.

6. The image forming apparatus according to claim 1, further comprising:

a rubbing member that rubs the conveyance member of the powder supply member covered with the powder.

7. The image forming apparatus according to claim 1, wherein a part where the powder pattern is not formed on the surface of the powder holding member is constituted by a release layer.

8. The image forming apparatus according to claim 1, wherein the surface of the powder holding member has a powder holding pattern having adhesiveness, and holds the powder by causing the powder to adhere to the powder holding pattern.

9. An image forming method performed by the image forming apparatus according to claim 1, the image forming method comprising:

nipping the recording medium on which the image pattern is formed at the nip part constituted by the powder holding member and the transfer member; and pasting powder constituting the powder pattern held on the surface of the powder holding member to the image pattern.

10. The image forming apparatus according to claim 1, wherein the powder holding pattern corresponding to the image pattern is formed by an electrophotographic image forming apparatus.

11. The image forming apparatus according to claim 10, wherein the powder holding pattern formed by the electrophotographic image forming apparatus is a toner pattern made of an aggregate of toner particles, which does not have adhesiveness in a formed state, and exhibits adhesiveness by subsequent heating.

12. The image forming apparatus according to claim 1, wherein the image pattern formed on the recording medium in advance is a photocurable resin.

13. The image forming apparatus according to claim 12, wherein the image pattern includes a base pattern formed by a UV inkjet apparatus.

14. An image forming apparatus comprising:

a powder holding member that holds a powder pattern formed of a powder and corresponding to an image pattern, the powder pattern being on a surface of the powder holding member and the image pattern being formed on a recording medium in advance;

a transfer member that constitutes a nip part for nipping the recording medium, on which the image pattern is formed, with the powder holding member, and pastes the powder constituting the powder pattern to the image pattern at the nip part;

the surface of the powder holding member has a powder holding pattern corresponding to the image pattern and made of a coloring material made of any of colorless, white, and colored, the powder is held by causing the powder to adhere to the powder holding pattern, and the powder holding pattern is transferred to the image pattern together with the powder at the nip part.

15. The image forming apparatus according to claim 14, wherein the powder holding pattern has a same color as the image pattern on the recording medium.

16. The image forming apparatus according to claim 14, further comprising:

a powder holding pattern forming apparatus that forms the powder holding pattern on the surface of the powder holding member.

17. The image forming apparatus according to claim 14, wherein the powder holding pattern corresponding to the image pattern is formed by an electrophotographic image forming apparatus.

18. The image forming apparatus according to claim 17, wherein the powder holding pattern formed by the electrophotographic image forming apparatus is a toner pattern made of an aggregate of toner particles, which does not have adhesiveness in a formed state, and exhibits adhesiveness by subsequent heating.

19. The image forming apparatus according to claim 14, wherein a base pattern to which the powder is pasted and a non-decorative pattern to which the powder is not pasted are formed as the image pattern on the recording medium, and the powder holding member holds the powder in a pattern shape corresponding to the base pattern in the image pattern.

* * * * *